(12) United States Patent
Naka et al.

(10) Patent No.: US 11,753,303 B2
(45) Date of Patent: Sep. 12, 2023

(54) CARBON NANOTUBE ARRAY AND ITS PRODUCTION METHOD, AND SPUN CARBON NANOTUBE YARN AND ITS PRODUCTION METHOD

(71) Applicant: SUGITA DENSEN CO., LTD., Saitama (JP)

(72) Inventors: Kenta Naka, Saitama (JP); Toru Iijima, Saitama (JP); Yuichi Sunaga, Saitama (JP); Akikazu Sugita, Saitama (JP); Shuji Tsuruoka, Saitama (JP)

(73) Assignee: SUGITA DENSEN CO., LTD., Saitama (JP)

( * ) Notice: Subject to any disclaimer, the term of this patent is extended or adjusted under 35 U.S.C. 154(b) by 1004 days.

(21) Appl. No.: 16/362,010

(22) Filed: Mar. 22, 2019

(65) Prior Publication Data

US 2020/0079652 A1 Mar. 12, 2020

(30) Foreign Application Priority Data

Sep. 12, 2018 (JP) .................................. 2018-170388

(51) Int. Cl.
*C01B 32/162* (2017.01)
*D01F 9/127* (2006.01)
(Continued)

(52) U.S. Cl.
CPC ............ *C01B 32/162* (2017.08); *D01F 9/127* (2013.01); *D02G 3/02* (2013.01); *B82Y 40/00* (2013.01);
(Continued)

(58) Field of Classification Search
CPC ..... C01B 32/16; C01B 32/152; C01B 32/158; C01B 32/162; C01B 2202/20;
(Continued)

(56) References Cited

U.S. PATENT DOCUMENTS 7,504,078 B1 * 3/2009 Jacques ................. B82Y 40/00
422/150
2004/0053780 A1 3/2004 Jiang et al.
(Continued)

FOREIGN PATENT DOCUMENTS

CN 104851765 A * 8/2015 ................ H01J 9/02
EP 3 263 522 A1 1/2018
(Continued)

OTHER PUBLICATIONS

Szabo "Influence of synthesis parameters on CCVD growth of vertically aligned carbon nanotubes over aluminum substrate." Scientific Reports | 7: 9557 (Year: 2017).*

(Continued)

*Primary Examiner* — Tri V Nguyen
(74) *Attorney, Agent, or Firm* — Sughrue Mion, PLLC

(57) ABSTRACT

A carbon nanotube array constituted by large numbers of carbon nanotubes vertically aligned on a substrate is produced by supplying a carbon source gas into a reaction vessel having a hydrogen gas atmosphere, in which a substrate on which a reaction catalyst comprising fine metal particles is formed is placed; forming large numbers of vertically aligned carbon nanotubes on the substrate by keeping a reaction temperature of 500-1100° C. for 0.5-30 minutes; and heat-treating the carbon nanotubes by stopping the supply of the carbon source gas and keeping 400-1100° C. for 0.5-180 minutes in a non-oxidizing atmosphere.

10 Claims, 24 Drawing Sheets

(51) Int. Cl.
*D02G 3/02* (2006.01)
*B82Y 40/00* (2011.01)

(52) U.S. Cl.
CPC ...... *C01B 2202/34* (2013.01); *C01P 2004/03* (2013.01); *C01P 2004/13* (2013.01); *C01P 2006/11* (2013.01); *D10B 2101/122* (2013.01)

(58) Field of Classification Search
CPC ............. C01B 2202/34; C01P 2004/03; C01P 2004/13; C01P 2006/11; B82Y 40/00
USPC ...................... 428/367; 423/445 R, 448, 460
See application file for complete search history.

(56) References Cited

U.S. PATENT DOCUMENTS

| | | | |
|---|---|---|---|
| 2006/0263524 A1* | 11/2006 | Jiang | C30B 29/02 427/249.1 |
| 2008/0095694 A1 | 4/2008 | Nakayama et al. | |
| 2009/0028779 A1 | 1/2009 | Wang et al. | |
| 2013/0266764 A1 | 10/2013 | Nakayama et al. | |
| 2018/0118571 A1 | 5/2018 | Maruyama | |

FOREIGN PATENT DOCUMENTS

| | | |
|---|---|---|
| JP | 2004-107196 A | 4/2004 |
| JP | 4512750 B2 | 7/2010 |
| JP | 2013-006708 A | 1/2013 |

OTHER PUBLICATIONS

Chaminda Jayasinghe et al., "Spinning yarn from long carbon nanotube arrays", Journal of Materials Research, vol. 26, No. 5, Mar. 14, 2011, pp. 645-651 (8 pages total).

Extended European Search Report dated Dec. 13, 2019, from the European Patent Office in application No. 19164771.8.

\* cited by examiner

CARBON NANOTUBE ARRAY AND ITS PRODUCTION METHOD, AND SPUN CARBON NANOTUBE YARN AND ITS PRODUCTION METHOD

FIELD OF THE INVENTION

The present invention relates to a carbon nanotube array constituted by large numbers of carbon nanotubes vertically aligned on a substrate and capable of being for lied into high-quality spun yarns, and its production method, and such a spun carbon nanotube yarn and its production method.

BACKGROUND OF THE INVENTION

Methods for forming a carbon nanotube array constituted by large numbers of carbon nanotubes vertically aligned on a substrate have conventionally been proposed. For example, JP 2004-107196 A discloses a method for producing a carbon nanotube array by annealing a substrate vapor-deposited with a metal catalyst at 300-400° C. for 10 hours in air, heating the substrate at 500-700° C. in an inert gas, and further introducing a hydrocarbon gas.

Japanese Patent 4,512,750 discloses a method for producing a carbon nanotube array by heating a substrate provided with a metal catalyst film at 700° C. in an inert gas, and further introducing a hydrocarbon gas.

JP 2013-6708 A discloses a method for producing a carbon nanotube array by keeping a substrate provided with a metal catalyst film at a metal-catalyst-activating temperature (for example, 500° C.) or higher for a certain period of time in an inert or reducing atmosphere, cooling it to the metal-catalyst-activating temperature or lower (200-500° C.), keeping it for a certain period of time with a hydrocarbon gas introduced, and then keeping it at a higher temperature than the metal-catalyst-activating temperature.

However, though carbon nanotube arrays obtained by those methods described in JP 2004-107196 A, Japanese Patent 4512750 and JP 2013-6708 A have somewhat improved spinnability, they are insufficient in the reproducibility and stability of spinnability, failing to be spun to continuous yarns, so that high-quality spun yarns of more than 10 m were not obtained without disconnection. Accordingly, carbon nanotube arrays having higher spinnability are desired.

OBJECT OF THE INVENTION

Accordingly, an object of the present invention is to provide a carbon nanotube array capable of being continuously spun to a high-quality yarn with good reproducibility, and its production method, and such a spun carbon nanotube yarn and its production method.

DISCLOSURE OF THE INVENTION

As a result of intensive research in view of the above object, the inventors have found that in the production of a carbon nanotube array constituted by large numbers of carbon nanotubes vertically aligned on a substrate by a gas-phase synthesis method, keeping a predetermined temperature in a non-oxidizing atmosphere after terminating the synthesis reaction by stopping the supply of a carbon source gas can provide the carbon nanotube array with remarkably improved spinnability. The present invention has been completed based on such finding.

Thus, the carbon nanotube array of the present invention is constituted by large numbers of carbon nanotubes vertically aligned on a substrate, the carbon nanotubes having an average length of 100-250 μm and a bulk density of 100-200 mg/cm$^3$.

The carbon nanotubes preferably have an average length of 120-220 μm and a bulk density of 120-180 mg/cm$^3$, more preferably have an average length of 130-200 μm and a bulk density of 130-170 mg/cm$^3$.

In an amplitude spectrum obtained by the two-dimensional Fourier transform of a two-dimensional region of 20 μm in width parallel to the substrate (in a horizontal direction) and 8 μm in height from the substrate, in a SEM photograph of a cross section of the carbon nanotube array parallel to the orientation of carbon nanotubes, a value $f_v$ obtained by integrating the amplitude from a center of the amplitude spectrum to a spatial frequency of 20 μm$^{-1}$ in a horizontal direction (direction of 0°), and a value $f_{20}$ obtained by integrating the amplitude from the center to the spatial frequency of 20 μm$^{-1}$ in a direction of 20° preferably meet the condition of $f_{20}/f_v \leq 0.35$.

The method of the present invention for producing a carbon nanotube array constituted by large numbers of carbon nanotubes vertically aligned on a substrate comprises supplying a carbon source gas into a reaction vessel having a hydrogen gas atmosphere, in which a substrate on which a reaction catalyst comprising fine metal particles is formed is placed, and keeping a reaction temperature of 500-1100° C. for 0.5-30 minutes to form large numbers of vertically aligned carbon nanotubes on the substrate; and heat-treating the carbon nanotubes by keeping the substrate on which the carbon nanotubes are formed, at 400-1100° C. for 0.5-180 minutes in a non-oxidizing atmosphere.

The temperature T (° C.) and keeping time t (minute) of the heat treatment meet the condition of preferably $t \geq 18,000 \times [1/(T+273)] - 17$, more preferably $t \geq 30,000 \times [1/(T+273)] - 28$, most preferably $t \geq 230,000 \times [1/(T+273)] - 210$.

The carbon nanotubes are preferably heat-treated at pressure of 0-1000 Pa in a hydrogen gas atmosphere, in a mixed gas atmosphere of a hydrogen gas and an inert gas (nitrogen gas and/or argon gas), or in vacuum.

The molar ratio $X_{H2}$ of hydrogen in the mixed gas of hydrogen and an inert gas, and the heat treatment temperature T (° C.) preferably meet the condition of $T \geq -190 \times X_{H2} + 890$.

The carbon source gas is preferably supplied at a temperature of 200° C. or higher and the reaction temperature or lower.

The heat treatment temperature of the carbon nanotube array is preferably 500-1000° C., and the heat treatment time is preferably 1-100 minutes. The heat treatment of the carbon nanotube array is more preferably carried out at a temperature of 600-900° C. for 3-60 minutes.

The reaction catalyst comprising fine metal particles can be produced by forming the metal film on the substrate, and heating the substrate at 200-500° C. for 1-10 minutes in a hydrogen gas atmosphere, thereby forming fine metal particles in the metal film.

The spun carbon nanotube yarn of the present invention is composed of the above carbon nanotubes, and has electric conductivity of 10$^3$ S/m or larger.

The method of the present invention for producing a spun carbon nanotube yarn having electric conductivity of 10$^3$ S/m or larger comprises spinning pluralities of continuous yarns of carbon nanotubes drawn from the above carbon nanotube array.

DESCRIPTION OF THE PREFERRED EMBODIMENTS

The embodiments of the present invention will be explained in detail below referring to the attached drawings. Explanations of one embodiment are applicable to other embodiments unless otherwise mentioned. Explanations below are not restrictive, but various modifications may be made within the scope of the technical idea of the present invention.

[1] Carbon Nanotube Array (a) Structure

Figure 1:
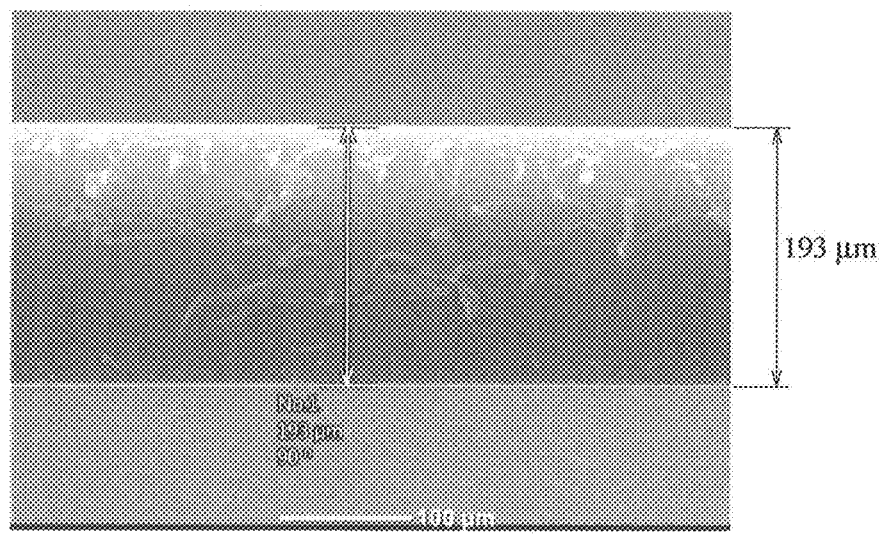
FIG. 1 is a SEM photograph showing an example (Sample 647) of the carbon nanotube arrays of the present invention having excellent spinnability.

As shown in FIG. 1, a carbon nanotube array obtained by the method of the present invention is constituted by large numbers of carbon nanotubes (CNTs) vertically aligned on a substrate. Each carbon nanotube is a short fiber having a two-layer structure with an outer diameter of about 3-7 nm.

Figure 2:
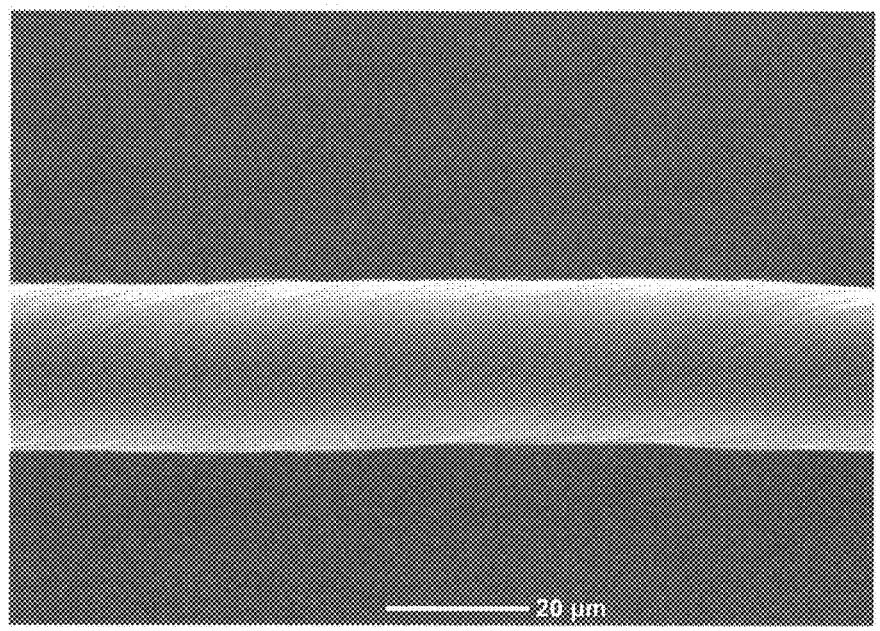
FIG. 2 is a SEM photograph showing a spun carbon nanotube yarn produced from the carbon nanotube array shown in FIG. 1.

A spun yarn as shown in FIG. 2 can be produced by spinning carbon nanotubes drawn from one side of the carbon nanotube array with tweezers, etc. Because carbon nanotubes in the spun yarn are aligned with a drawing direction, a strong spun yarn can be obtained by spinning the carbon nanotubes.

Figure 3:
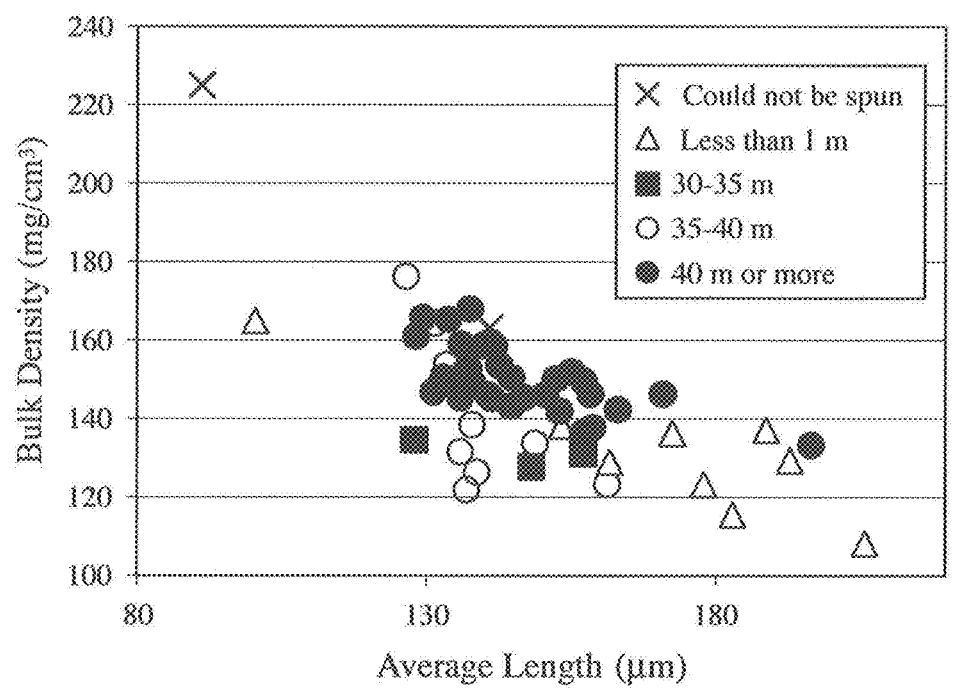
FIG. 3 is a graph showing the relation between the average length and bulk density of carbon nanotubes produced by a gas-phase synthesis method and the spinnability of a carbon nanotube array.

FIG. 3 shows the relation between the average length and bulk density of carbon nanotubes and the length of the resultant spun carbon nanotube yarn, in carbon nanotube arrays each formed on a substrate by a gas-phase synthesis method in Example 6 described later. A longer spun carbon nanotube yarn indicates that the carbon nanotube array has better spinnability. As shown in FIG. 3, longer carbon nanotubes tend to have lower bulk densities. To provide the carbon nanotube array with good spinnability, carbon nanotubes on the substrate has an average length of 100-250 μm and a bulk density of 100-200 mg/cm$^3$. The carbon nanotubes have preferably an average length of 120-220 μm and a bulk density of 120-180 mg/cm$^3$, more preferably an average length of 130-200 μm and a bulk density of 130-170 mg/cm$^3$.

Figure 4A:
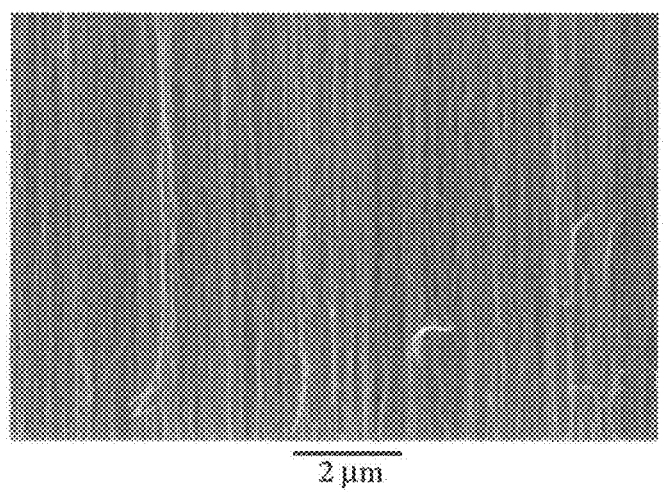
FIG. 4(a) is a SEM photograph of a carbon nanotube array having excellent spinnability (Sample 647), which was taken in a cross section parallel to the orientation near the substrate.
Figure 5A:
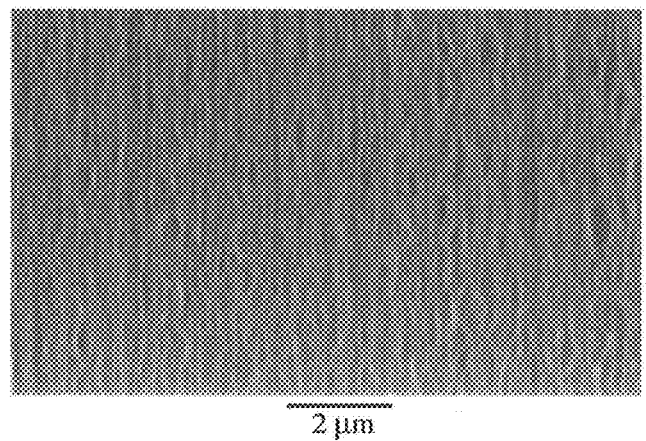
FIG. 5(a) is a SEM photograph of an unspinnable carbon nanotube array (Sample 601), which was taken in a cross section parallel to the orientation near the substrate.

As carbon nanotubes grow on a substrate vertically with more regularity, the carbon nanotube array exhibits better spinnability. Particularly the orientation of carbon nanotubes near the substrate has large influence on spinnability. As a SEM photograph (acceleration voltage: 15 kV, magnification: 10000 times) of a cross section (parallel to the orientation of carbon nanotubes) of the carbon nanotube array near the substrate, a SEM photograph of a carbon nanotube array having excellent spinnability (Sample 647 in Example 6) is shown in FIG. 4(a), and a SEM photograph of an unspinnable carbon nanotube array (Sample 601 in Example 6) is shown in FIG. 5(a). The comparison of FIGS. 4(a) and 5(a) indicates that carbon nanotubes are regularly arranged in the carbon nanotube array having excellent spinnability, while their arrangement is largely disturbed in the unspinnable carbon nanotube array.

Figure 4B:
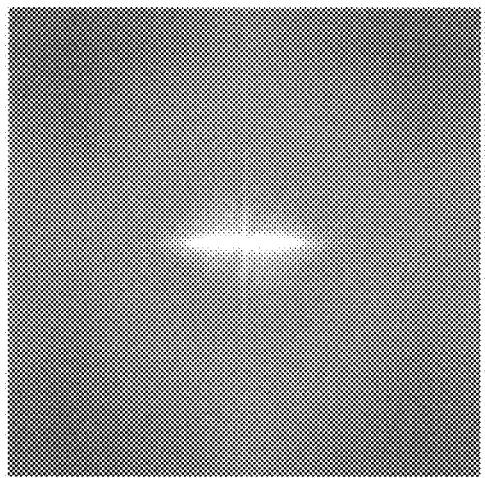
FIG. 4(b) is a photograph showing an amplitude spectrum obtained by the two-dimensional Fourier transform of the SEM photograph of FIG. 4(a).
Figure 5B:
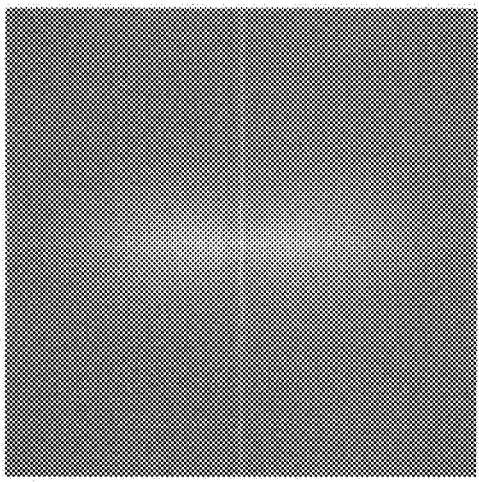
FIG. 5(b) is a photograph showing an amplitude spectrum obtained by the two-dimensional Fourier transform of the SEM photograph of FIG. 5(a).

The amplitude spectrum of the carbon nanotube array having excellent spinnability has a large horizontal component as shown in FIG. 4(b), while the amplitude spectrum of the unspinnable carbon nanotube array is more isotropic as shown in FIG. 5(b). Namely, carbon nanotubes in the carbon nanotube array having excellent spinnability [FIG. 4(b)] are strongly oriented in a horizontal direction, while those in the unspinnable carbon nanotube array [FIG. 5(b)] are more randomly oriented.

Figure 6:
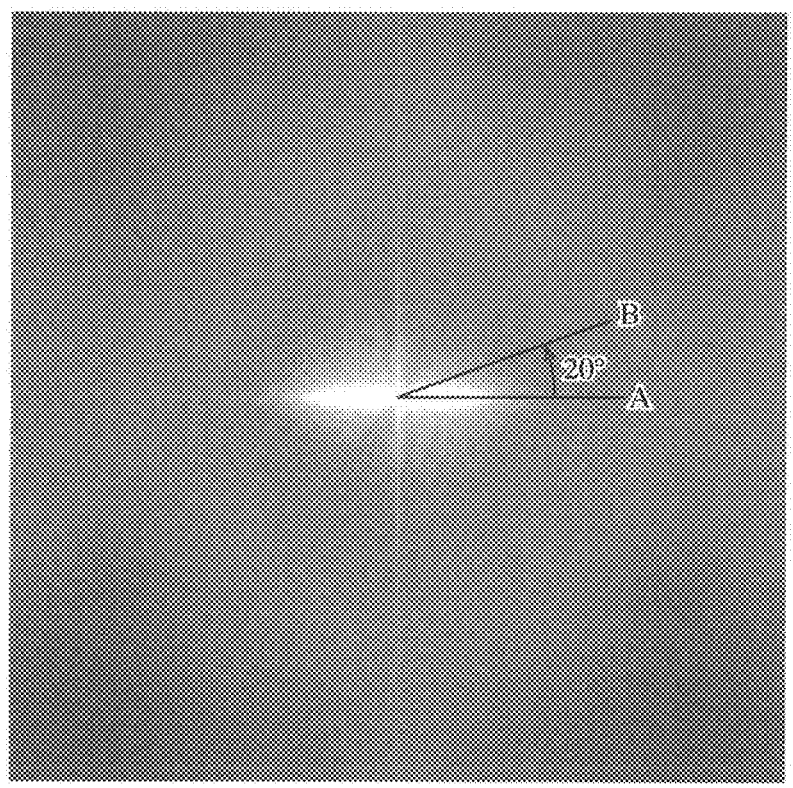
FIG. 6 is a view showing the method of determining $f_{2D}$ and $f_v$.

The orientation of carbon nanotubes in a carbon nanotube array can be evaluated by a ratio ($f_{20}/f_v$), wherein in an amplitude spectrum obtained by the two-dimensional Fourier transform of a two-dimensional region in a SEM photograph of a cross section of the carbon nanotube array, $f_v$ represents a value obtained by integrating the amplitude from a center of the amplitude spectrum in a horizontal direction (direction of 0°), and $f_{20}$ represents a value obtained by integrating the amplitude from a center of the amplitude spectrum in a direction of 20°. Specifically, in a SEM photograph of a carbon nanotube array taken in a cross section parallel to the orientation of carbon nanotubes, a two-dimensional region of 20 μm in width parallel to the substrate (horizontal direction) and 8 μm in height from the substrate is subjected to two-dimensional Fourier transform to determine an amplitude spectrum, and as shown in FIG. 6, the amplitude (line A) is integrated from a center of the amplitude spectrum to a spatial frequency of 20 μm$^{-1}$ in a horizontal direction (direction of 0°) to obtain a value $f_v$, and the amplitude (line B) is integrated from a center of the amplitude spectrum to the spatial frequency of 20 μm$^{-1}$ in a direction of 20° to obtain a value $f_{20}$, and a ratio of $f_{20}$ to $f_v$ ($f_{20}/f_v$) is calculated. The smaller the ratio $f_{20}/f_v$, the higher the periodicity of carbon nanotubes in a horizontal direction in a SEM image of a cross section of the carbon nanotube array (carbon nanotubes are vertically aligned with high regularity). Oppositely, a larger ratio $f_{20}/f_v$ provides lower periodicity in a horizontal direction, resulting in the irregular arrangement of carbon nanotubes.

It may be said that when the condition of $f_{20}/f_v \leq 0.35$ is met, carbon nanotubes are highly oriented, so that a carbon nanotube array constituted by such carbon nanotubes has excellent spinnability. The $f_{20}/f_v$ is 0.29 in the amplitude spectrum of a carbon nanotube array having excellent spinnability [FIG. 4(b)], while the $f_{20}/f_v$ is 0.43 in the amplitude spectrum of an unspinnable carbon nanotube array [FIG. 5(b)]. The $f_{20}/f_v$ ratio is more preferably 0.30 or less.

(b) Spun Yarn

Figure 7A:
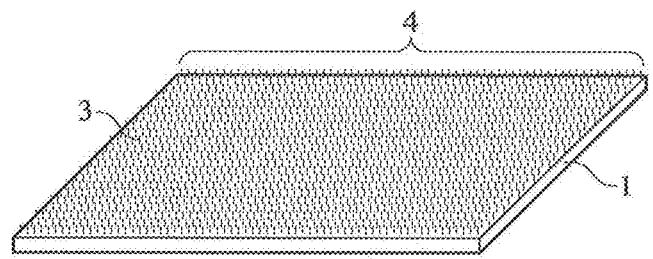
FIGS. 7(a) to 7(d) are schematic views showing the steps of producing a spun yarn from a carbon nanotube array formed on a substrate.
Figure 7B:
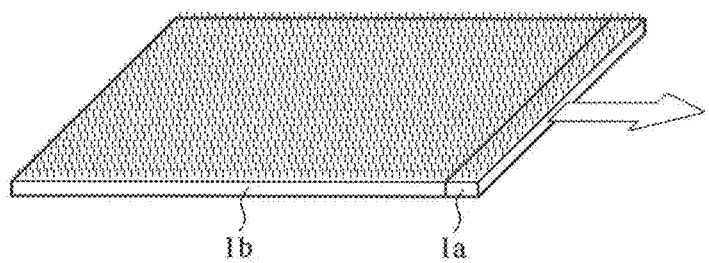
Figure 7C:
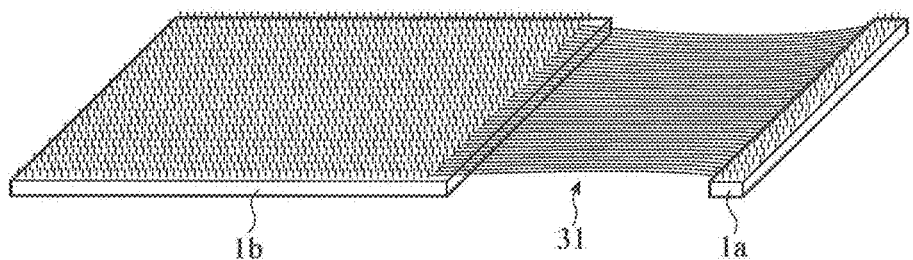
Figure 7D:
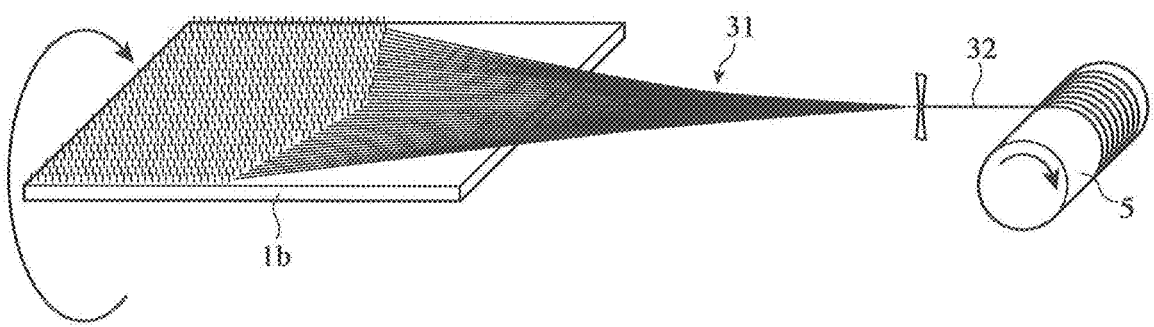

FIGS. 7(a) to 7(d) schematically show the steps of producing a spun yarn from a carbon nanotube array 4 formed on a substrate. The carbon nanotube array 4 formed by the method of the present invention is, as shown in FIG. 7(a), vertically aligned on the substrate 1. As shown in FIG. 7(b), the substrate 1 is divided along a line parallel to one side, which is 3-5 mm separate from the side, and a small substrate piece 1a is separated from a large remaining substrate portion 1b in a horizontal direction or slightly upward from the horizontal direction, so that carbon nanotubes 3 are continuously peeled from the large substrate portion 1b with entanglement, forming large numbers (pluralities) of fibers 31 oriented in substantially parallel [see FIG. 7(c)]. Pluralities of fibers 31 thus drawn are spun by, for example, rotating the substrate piece 1b around the drawing direction, to form a spun yarn 32 of carbon nanotubes 3 [see FIG. 7(d)]. The resultant spun yarn 32 is wound on a bobbin 5, etc.

Figure 8A:
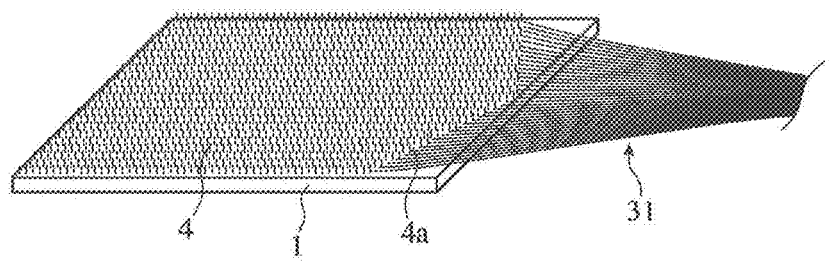
FIGS. 8(a) to 8(c) are schematic views showing the production of a yarn by spinning from a carbon nanotube array having excellent spinnability.
Figure 8B:
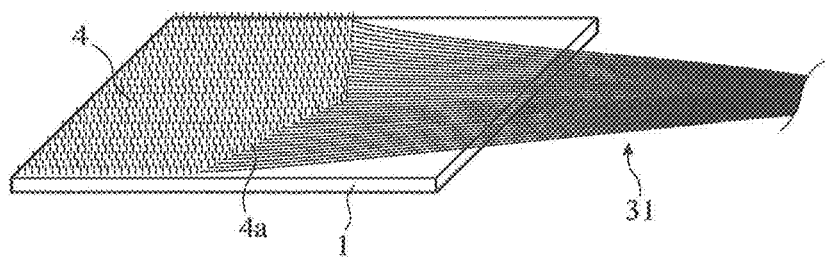
Figure 8C:
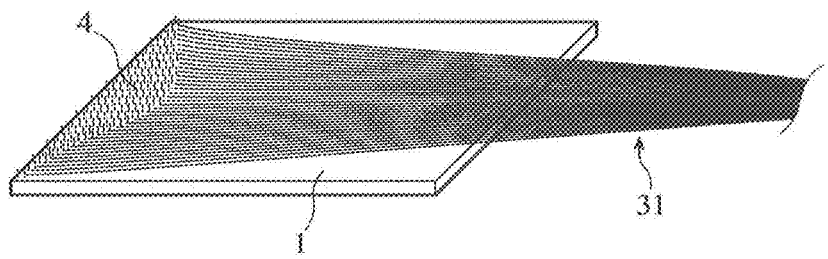
Figure 8D:
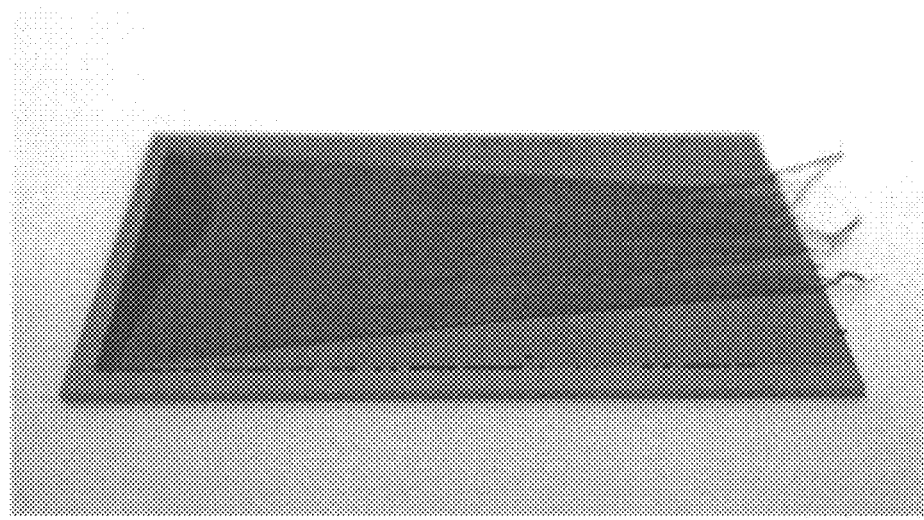
FIG. 8(d) is a photograph showing the spinning of a yarn from a carbon nanotube array having excellent spinnability.

FIGS. 8(a), 8(b) and 8(c) schematically show the successive decrease in the carbon nanotube array 4 on the substrate 1 by spinning. In the case of a carbon nanotube array 4 having excellent spinnability, carbon nanotubes are drawn from a side of the substrate 1 without disconnection to form pluralities of fibers 31. In this case, a front line 4a from which the carbon nanotube array 4 is drawn tends to be in a triangular shape with its width-direction center as an apex projecting toward the drawing direction. When the carbon nanotube array 4 decreases while keeping the triangular shape, pluralities of carbon nanotube fibers 31 are formed continuously up to the end without disconnection. Finally, as shown in FIGS. 8(c) and 8(d), the carbon nanotube array 4 tends to remain substantially in an isosceles triangle shape having an apex projecting toward the drawing direction.

Figure 9A:
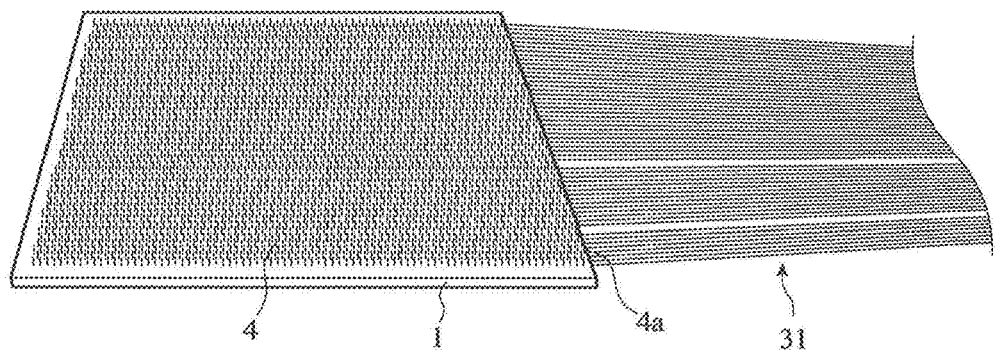
FIGS. 9(a) to 9(d) are schematic views showing the spinning of a yarn from a carbon nanotube array having low spinnability.
Figure 9B:
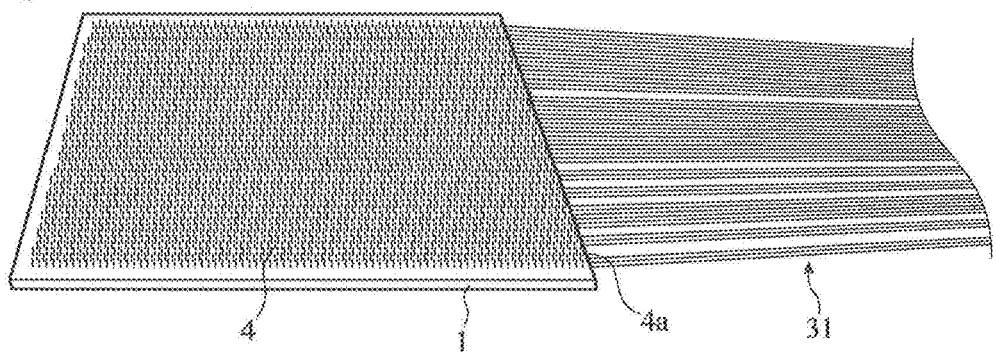
Figure 9C:
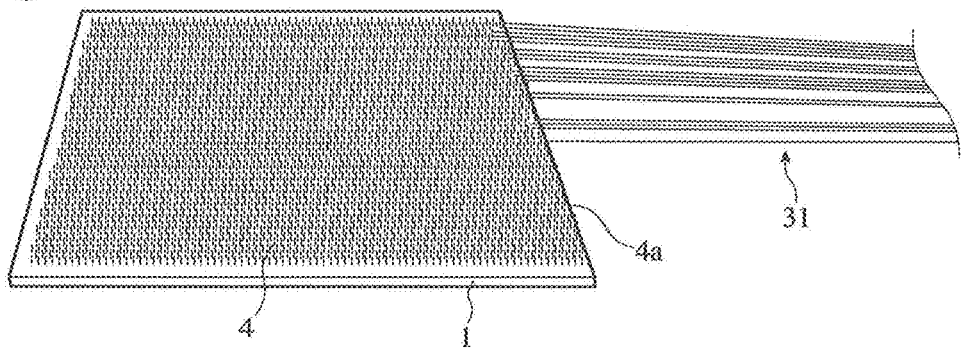
Figure 9D:
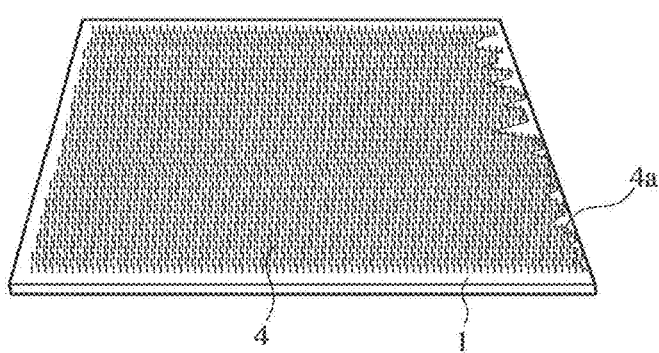
Figure 10:
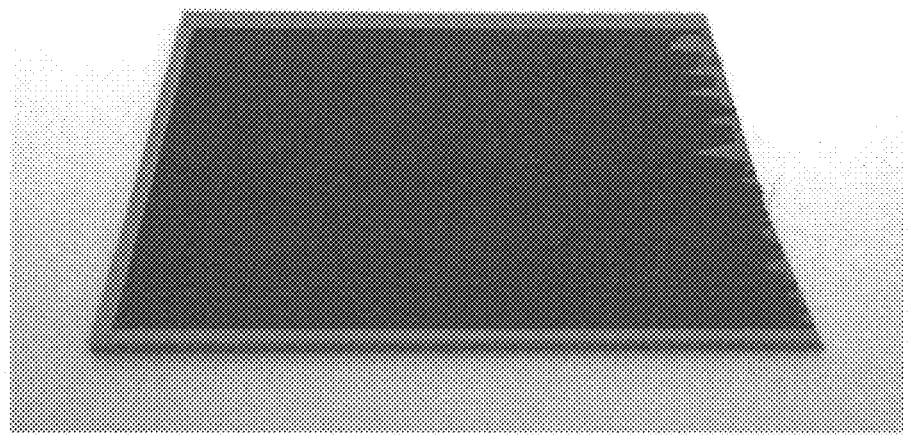
FIG. 10 is a photograph showing a carbon nanotube array having slightly low spinnability, from which a yarn was spun.

FIGS. 9(a), 9(b) and 9(c) schematically show the progress of spinning of a carbon nanotube array 4 having low spinnability. Because carbon nanotubes being drawn are insufficiently entangled, the resultant fibers 31 are mostly soon disconnected, leaving a ragged or zigzag edge 4a (front line of fibers 31) to the carbon nanotube array 4 remaining on the substrate 1. In such a state, the number of fibers 31 is small, resulting in a thin spun yarn which is easily disconnected.

It is considered that the stable formation of a high-quality spun yarn of carbon nanotubes is largely affected by the properties of carbon nanotubes (diameters, lengths, crystallinity, bulk densities, shapes, etc.), the quality of the carbon nanotube array (length, uniformity, orientation, etc. of each carbon nanotube) and the conditions of the substrate (material, size, type and shape of catalyst, etc.). Particularly when carbon nanotubes are uniformly in an optimum shape in the carbon nanotube array, carbon nanotubes continuously drawn from a side of the carbon nanotube array are well entangled, resulting in pluralities of uniform, continuous carbon nanotube fibers oriented in one direction.

In order that the carbon nanotube array provides an excellent spun yarn, the average length (expressed by the average height of the carbon nanotube array) of carbon nanotubes vertically aligned on the substrate is 100-250 µm, preferably 120-220 µm, more preferably 130-200 µm. Also, the bulk density of carbon nanotubes is 100-200 mg/cm$^3$, preferably 120-180 mg/cm$^3$, more preferably 130-170 mg/cm$^3$. Though the size of the substrate on which the carbon nanotube array is formed is not particularly restricted, it is preferably about 2 cm in width and about 2-4 cm in length from the aspect of spinnability.

The length and diameter of a spun yarn obtained by the method of the present invention differ depending on the size of the substrate 1 and the lengths of carbon nanotubes. For example, when carbon nanotubes of about 160 µm in length are formed on a substrate of 2 cm×4 cm, and drawn vertically from a 2-cm-wide side of the resultant carbon nanotube array, large numbers of substantially uniformly arranged fibers 31 are obtained, and the spinning of these fibers 31 can provide spun yarns of about 20 µm in diameter and about 40 m or more in length. As long as carbon nanotubes have the above average length and bulk density, of course not restrictive, spun yarns of 40 m or more in length can be produced stably.

The spun carbon nanotube yarn of the present invention has electric conductivity of preferably $10^3$ S/m or larger, more preferably $10^4$ S/m or larger, most preferably $5×10^4$ S/m or larger.

[2] Production Method Carbon Nanotube Array

The method the present invention for producing a carbon nanotube array constituted by large numbers of carbon nanotubes vertically aligned on a substrate comprises supplying a carbon source gas into a reaction vessel having a hydrogen gas atmosphere, in which a substrate on which a reaction catalyst comprising fine metal particles is formed is placed, and keeping a reaction temperature of 500-1100° C. for 0.5-30 minutes to form large numbers of carbon nanotubes vertically aligned on the substrate (synthesis step); and heat-treating the carbon nanotubes by keeping the substrate on which carbon nanotubes are formed at 400-1100° C. for 0.5-180 minutes in a non-oxidizing atmosphere (heat treatment step). Because the resultant carbon nanotube array has high spinnability, a high-quality spun yarn can be obtained from this carbon nanotube array with high reproducibility.

Figure 12A:
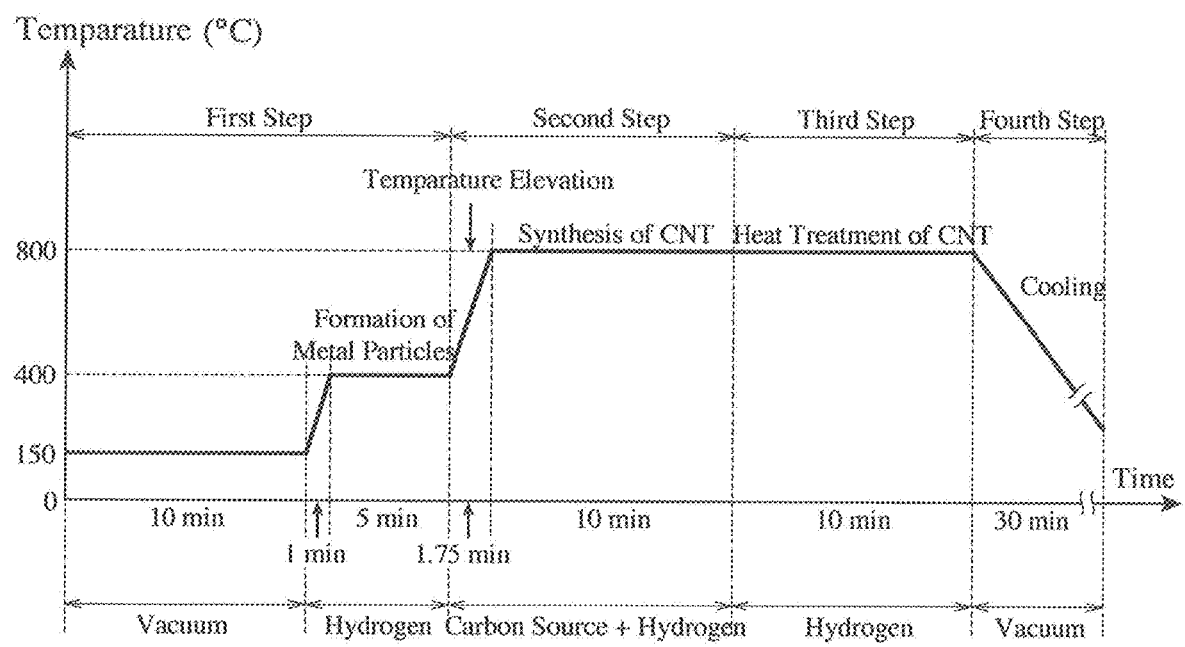
FIG. 12(a) is a graph showing an example of reaction schemes of producing the carbon nanotube array of the present invention.

FIG. 12(a) shows a typical reaction scheme of producing the carbon nanotube array of the present invention. Taking this reaction scheme for example, the method of the present invention will be explained in detail below.

(1) Step of Forming Reaction Catalyst Comprising Fine Metal Particles (First Step)

Figure 11A:
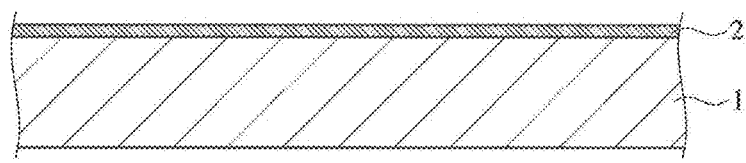
FIGS. 11(a) to 11(c) are cross-sectional views schematically showing the production steps of a carbon nanotube array.

As shown in FIG. 11(a), a metal film 2 which is to be turned to a catalyst is first formed on a substrate 1 in a flat plate shape. The substrate 1 may be (i) a substrate of $SiO_2$ such as silicon provided with an oxide film, silica, etc., on which an $Al_2O_3$ film is formed by a sputtering method, etc.; and (ii) a sapphire ($Al_2O_3$) substrate. Preferable from the aspect of cost is an $SiO_2$ substrate having an $Al_2O_3$ film on the surface. The $Al_2O_3$ film formed on an $SiO_2$ substrate preferably has a main crystal structure corresponding to neither spinel nor corundum. The crystal structure of the $Al_2O_3$ film can be analyzed by X-ray diffraction. A thin metal (for example, Fe) film 2 is formed on the substrate 1 by an electron beam vapor deposition method, etc.

Figure 11B:
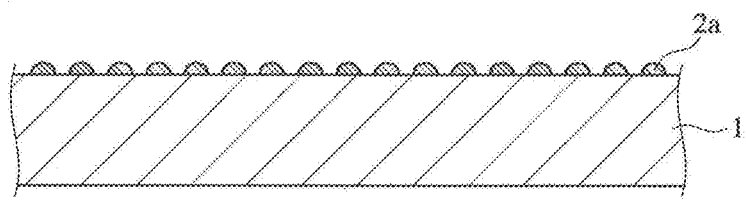

The substrate 1 provided with a thin metal (Fe) film 2 is placed in a reaction vessel (CVD apparatus), and heated in a hydrogen gas atmosphere to form fine metal particles 2a in the metal film 2 as shown in FIG. 11(b), generating catalytic activity. The heating temperature is preferably 200-500° C., and the heating time is preferably 1-10 minutes.

(2) Synthesis Step of Forming Carbon Nanotubes (Second Step)

Figure 11C:
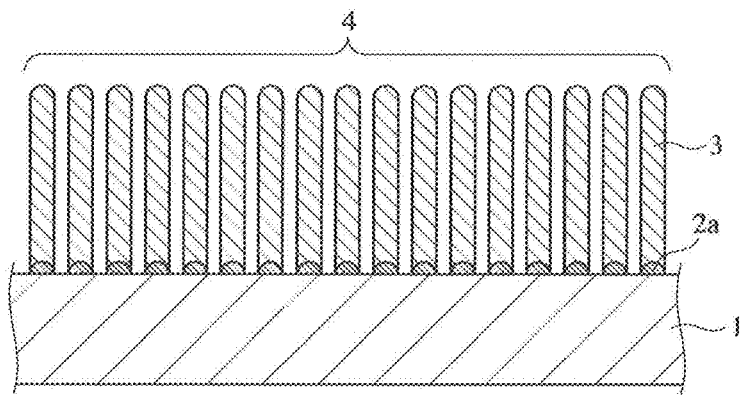

A carbon source gas (starting material gas) is supplied to catalytically active fine metal particles 2a in a hydrogen gas atmosphere in the reaction vessel (CVD apparatus), to synthesize carbon nanotubes 3 on the fine metal particles 2a by a gas-phase synthesis method [FIG. 11(c)].

The supply of the carbon source gas is started preferably simultaneously with or during the start of temperature elevation to the reaction temperature. Though not restrictive, the temperature-elevating speed is preferably 50-1000° C./min, more preferably 100-500° C./min. The carbon source gas is supplied preferably at a temperature of 200° C. or higher and the reaction temperature or lower, more preferably at a temperature of 400-900° C.

The reaction temperature of the carbon source gas (synthesis temperature of carbon nanotubes) is 500-1100° C. With a mixed gas of a hydrogen gas and a carbon source gas kept at the above reaction temperature for 0.5-30 minutes, carbon nanotubes are synthesized from the carbon source gas by a gas-phase synthesis method. Though not particularly restrictive, the carbon source gas is preferably an acetylene gas. A molar ratio of the carbon source gas in a reaction atmosphere gas (hydrogen gas+carbon source gas) is preferably 0.01-1, more preferably 0.05-0.6, most preferably 0.1-0.4. The reaction temperature is preferably 800-900° C., and the reaction time (time of keeping the reaction temperature) is preferably 5-20 minutes. Under the above reaction conditions, carbon nanotubes with a high bulk density grow vertically on the catalyst layer on the substrate 1.

(3) Heat Treatment Step of Carbon Nanotubes (Third Step)

The substrate on which the carbon nanotubes are formed is kept at 400-1100° C. for 0.5-180 minutes in a non-oxidizing atmosphere. The non-oxidizing atmosphere is preferably a hydrogen gas atmosphere, a mixed gas atmosphere of a hydrogen gas and a non-oxidizing gas (inert gas such as Ar, $N_2$, etc.), or vacuum. The heat treatment is preferably conducted at pressure of 0-1000 Pa. To achieve the hydrogen gas atmosphere, only the hydrogen gas is supplied while stopping the carbon source gas. To achieve the mixed gas atmosphere of a hydrogen gas and an inert gas, the inert gas is supplied while stopping the carbon source gas. To achieve vacuum, evacuation is conducted while stopping the carbon source gas and the hydrogen gas. In this case, the vacuum degree is preferably 10 Pa or less.

Figure 13:
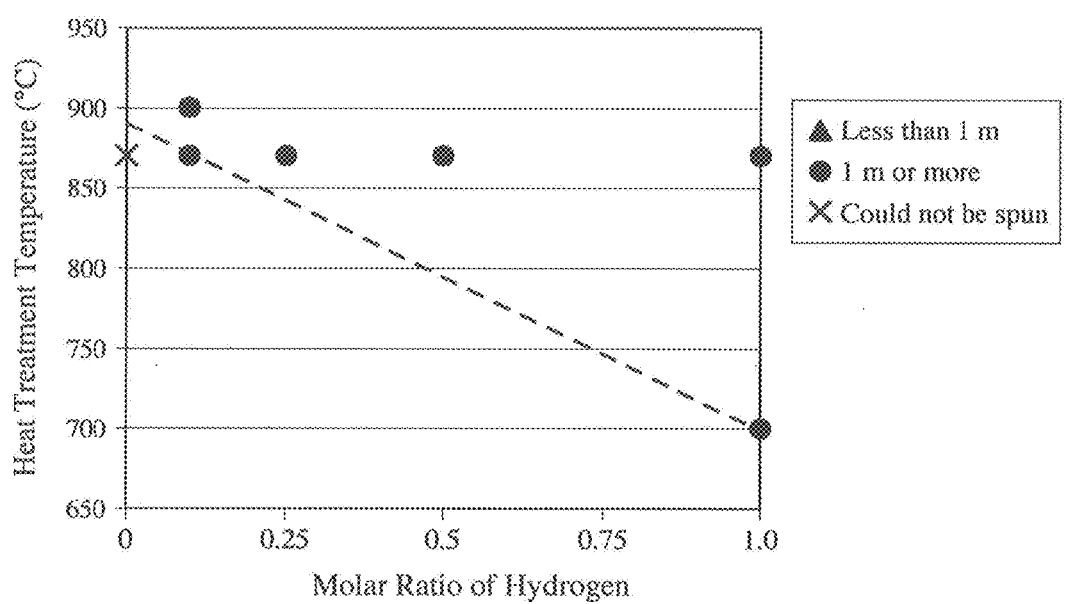
FIG. 13 is a graph showing the relation between the molar ratio of hydrogen and a heat treatment temperature and spinnability when the heat treatment was conducted in a mixed gas atmosphere of hydrogen and nitrogen.

When the heat treatment is conducted in a mixed gas atmosphere of a hydrogen gas and an inert gas, the molar ratio $X_{H2}$ of hydrogen in the mixed gas and the heat treatment temperature (keeping temperature in the heat treatment step) T (° C.) preferably meet the condition of $T \geq -190 \times X_{H2} + 890$. FIG. 13 shows the relation between the molar ratio of hydrogen and the heat treatment temperature and spinnability, when the heat treatment is conducted in a mixed gas atmosphere of hydrogen and nitrogen (entire pressure: 800 Pa). The heat treatment conditions of carbon nanotube arrays providing spun yarns of 1 m or more are shown by black circles, and the heat treatment condition of a carbon nanotube array providing a spun yarn of less than 1 m is shown by a black triangle. A dotted line in FIG. 13 is expressed by the formula of $T=-190 \times X_{H2}+890$, a region on or above this dotted line meeting the condition of $T \geq -190 \times X_{H2}+890$. With the molar ratio of hydrogen and the heat treatment temperature set in this region, a carbon nanotube array having good spinnability is obtained.

Figure 12B:
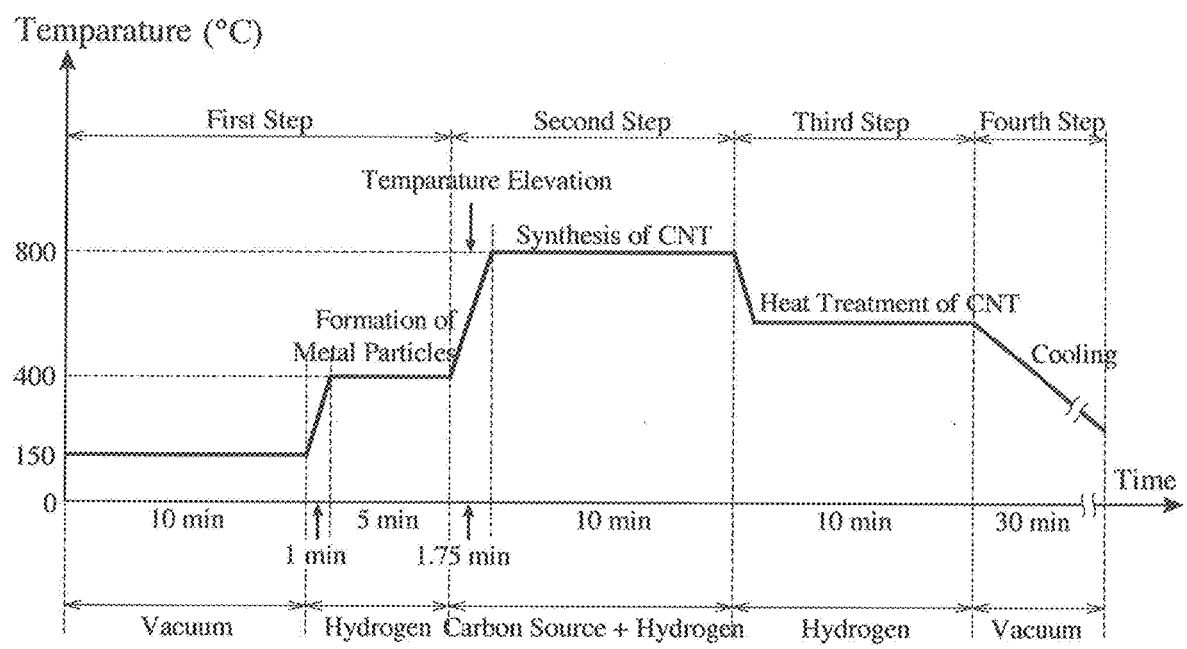
FIG. 12(b) is a graph showing another example of reaction schemes of producing the carbon nanotube array of the present invention.
Figure 12C:
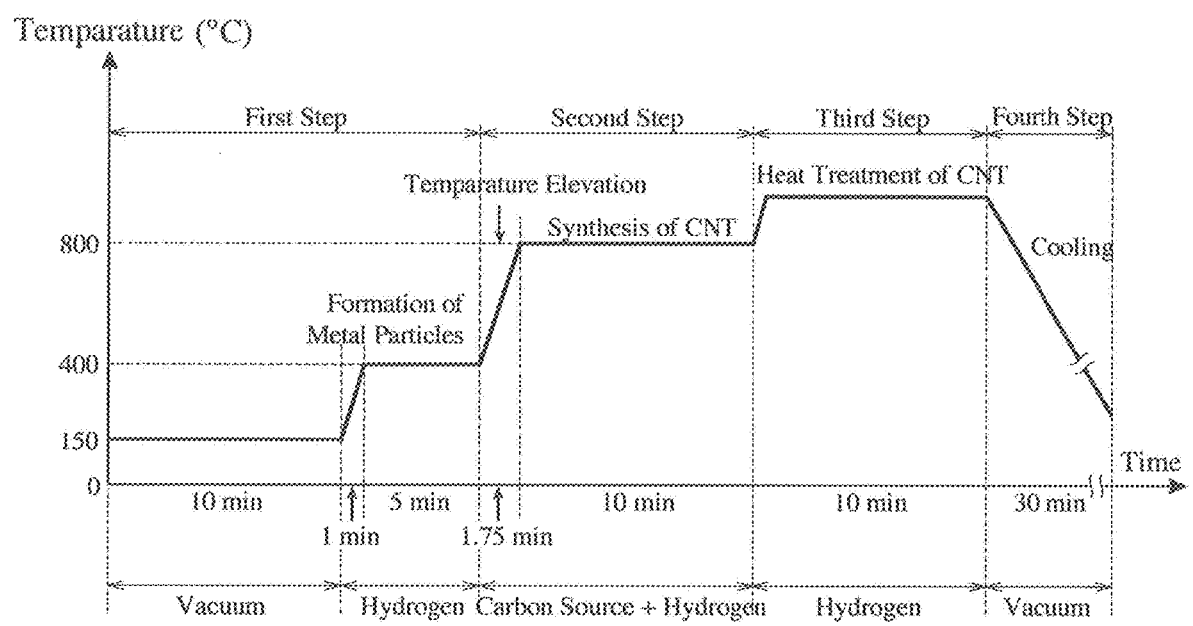
FIG. 12(c) is a graph showing a further example of reaction schemes of producing the carbon nanotube array of the present invention.

The heat treatment temperature may be the same as or different from the reaction temperature. The heat treatment temperature may be the same as the reaction temperature as shown in FIG. 12(a), lower than the reaction temperature as shown in FIG. 12(b), or higher than the reaction temperature as shown in FIG. 12(c). The heat treatment temperature is preferably equal to or higher than the reaction temperature, and more preferably equal to the reaction temperature from the aspect of productivity.

To obtain a carbon nanotube array having good spinnability, the temperature T (° C.) and keeping time t (minute) in the heat treatment meet the condition of preferably $t \geq 18,000 \times [1/(T+273)]-17$, more preferably $t \geq 30,000 \times [1/(T+273)]-28$, most preferably $t \geq 230,000 \times [1/(T+273)]-210$.

Figure 14:
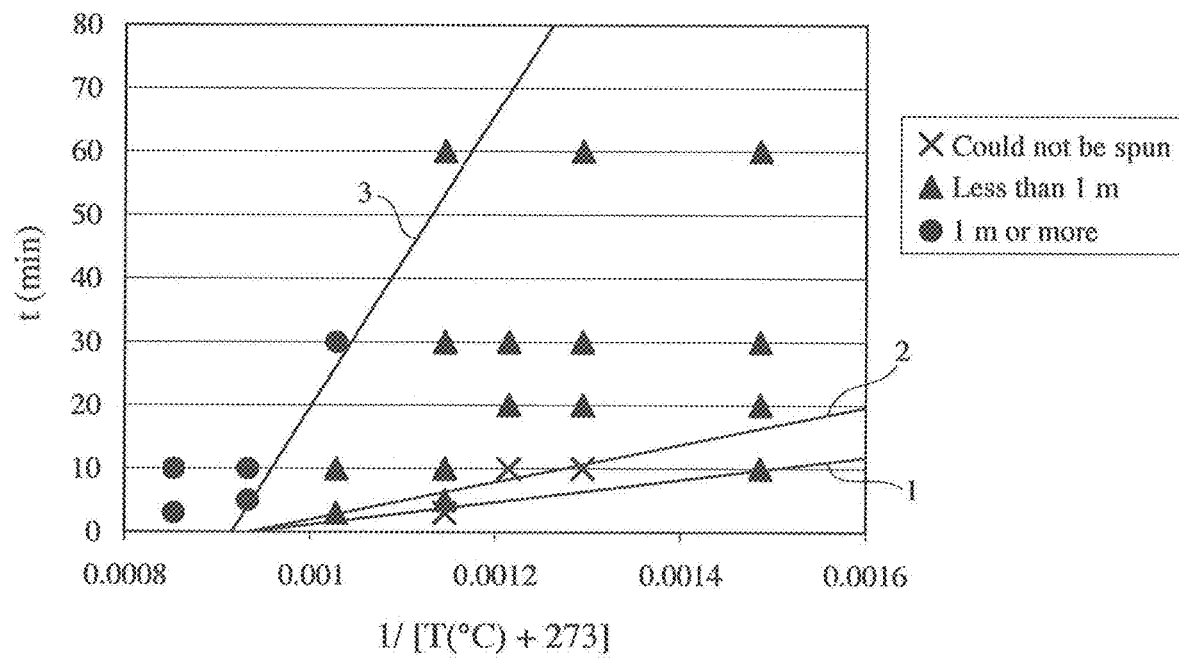
FIG. 14 is a graph showing the relation between the temperature and keeping time of a heat treatment and spinnability when the heat treatment is conducted in a hydrogen atmosphere.

FIG. 14 shows the relation between the temperature T (° C.) and keeping time t (minute) of the heat treatment in a hydrogen atmosphere and spinnability. Heat treatment conditions providing spun yarns of 1 m or more are shown by black circles, those providing spun yarns of less than 1 m are shown by black triangles, and those unspinnable are shown by crosses. In FIG. 14, a straight line 1 is expressed by the formula of $t=18,000 \times [1/(T+273)]-17$, a straight line 2 is expressed by the formula of $t=30,000 \times [1/(T+273)]-28$, and a straight line 3 is expressed by the formula of $t=230,000 \times [1/(T+273)]-210$. It is clear that carbon nanotube arrays having excellent spinnability are obtained in a region on or above the straight line 3 (region expressed by $t \geq 230,000 \times [1/(T+273)]-210$).

It is not clearly known why spinnability is remarkably improved by the heat treatment, but it may be presumed that the heat treatment enhances the entanglement of carbon nanotubes. The heat treatment temperature is preferably 500-1000° C., more preferably 600-900° C., most preferably 700-900° C. The heat treatment time (keeping time in the heat treatment step) is preferably 1-100 minutes, more preferably 3-60 minutes, most preferably 5-60 minutes.

(4) Cooling Step (Fourth Step)

After the completion of the heat treatment step, the reaction vessel is cooled while stopping the non-oxidizing gas (or keeping vacuum). Cooling is preferably conducted to about 400° C. in vacuum, and then to room temperature while supplying a nitrogen gas. The cooling speed is not particularly restricted.

The present invention will be explained in further detail by Examples below, without intention of restricting the present invention thereto.

Example 1

Carbon nanotube arrays of Samples 101-104 were produced by the following methods.

Sample 101 (The Present Invention)

A thin $SiO_2$ film as thick as about 30 nm was formed by thermal oxidation on a flat silicon plate of 20 mm×40 mm cut out of a 6-inch silicon wafer available from SUMCO, and a thin $Al_2O_3$ film as thick as about 15 nm was formed thereon by sputtering. After $Al_2O_3$ was washed with an organic solvent and treated with ozone, a thin Fe film as thick as 1.7-2.0 nm was formed by electron beam vapor deposition.

The flat silicon plate provided with a thin Fe film was placed in a CVD apparatus (available from Youtec Co., Ltd.), and heated at 150° C. for 10 minutes in vacuum of 10 Pa or less to remove air and water remaining in the substrate. A hydrogen gas atmosphere in the CVD apparatus was then kept at 400° C. for 5 minutes, to reduce an oxide film on the thin Fe film surface and form fine Fe particles having catalytic activity.

After the supply of an acetylene gas was started at 400° C., the temperature was elevated to 800° C. over 1 minute 45 seconds in an mixed gas of an acetylene gas and a hydrogen gas, and kept at 800° C. for 10 minutes to synthesize carbon nanotubes (third step). The molar ratio of the acetylene gas in the mixed gas (entire pressure: 800 Pa) was 0.126. With the supply of an acetylene gas stopped after the synthesis of carbon nanotubes, the carbon nanotubes were heat-treated at 800° C. for 10 minutes in a hydrogen gas atmosphere (pressure: 800 Pa). With the supply of a hydrogen gas stopped after the heat treatment, the temperature was lowered to room temperature over 30 minutes in vacuum, to obtain the carbon nanotube array 4 of Sample 101 in which carbon nanotubes 3 were formed on the substrate 1. The above reaction scheme is shown in FIG. 12(a).

Sample 102 (The Present Invention)

A carbon nanotube array was produced in the same manner as in Sample 101, except that the supply of a hydrogen gas was stopped simultaneously with stopping the synthesis by stopping the supply of an acetylene gas, and that the heat treatment was conducted in vacuum of 10 Pa or less.

Sample 103 (Comparative Example)

A carbon nanotube array was produced in the same manner as in Sample 101 except for conducting no heat treatment.

Sample 104 (Comparative Example)

A carbon nanotube array was produced in the same manner as in Sample 101 except for conducting the heat treatment in an air atmosphere in place of the hydrogen gas atmosphere.

Figure 15:
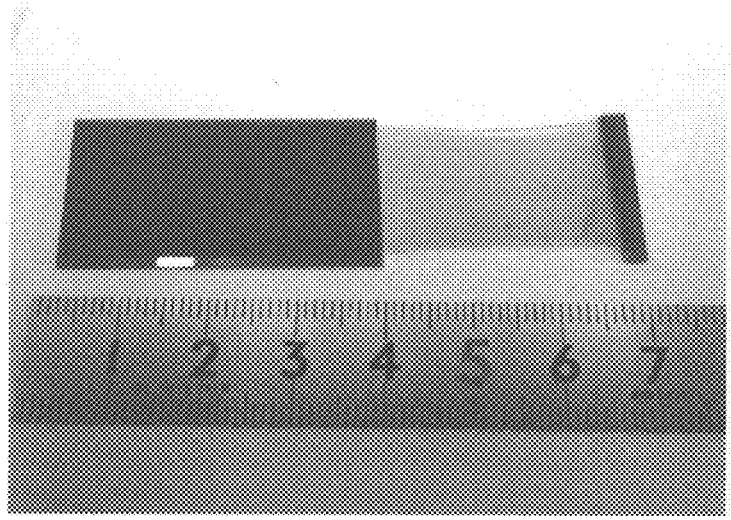
FIG. 15 is a photograph showing the drawing of pluralities of continuous carbon nanotube fibers from a carbon nanotube array.

The spinnability of the carbon nanotube arrays of Samples 101-104 was evaluated by the following method. First, as shown in FIG. 15, the substrate was divided along a line parallel to one short side (side of 20 mm), which was 3-5 mm separate from the short side, and a small substrate piece was 2-3 cm separated in a horizontal direction to observe carbon nanotube fibers between both substrate pieces by the naked eye, and the lengths of spun yarns produced by spinning the carbon nanotube fibers were then measured to evaluate spinnability by the following standard. The evaluation results are shown in Table 1.

TABLE 1

| Sample | Heat Treatment Conditions of CNT | Spinnability |
|---|---|---|
| 101 | 800° C., 10 min. in Hydrogen Gas | Good |
| 102 | 800° C., 10 min. in Vacuum | Good |
| 103* | No | Poor |
| 104* | 800° C., 10 min. in Air | Poor |

Figure 16A:
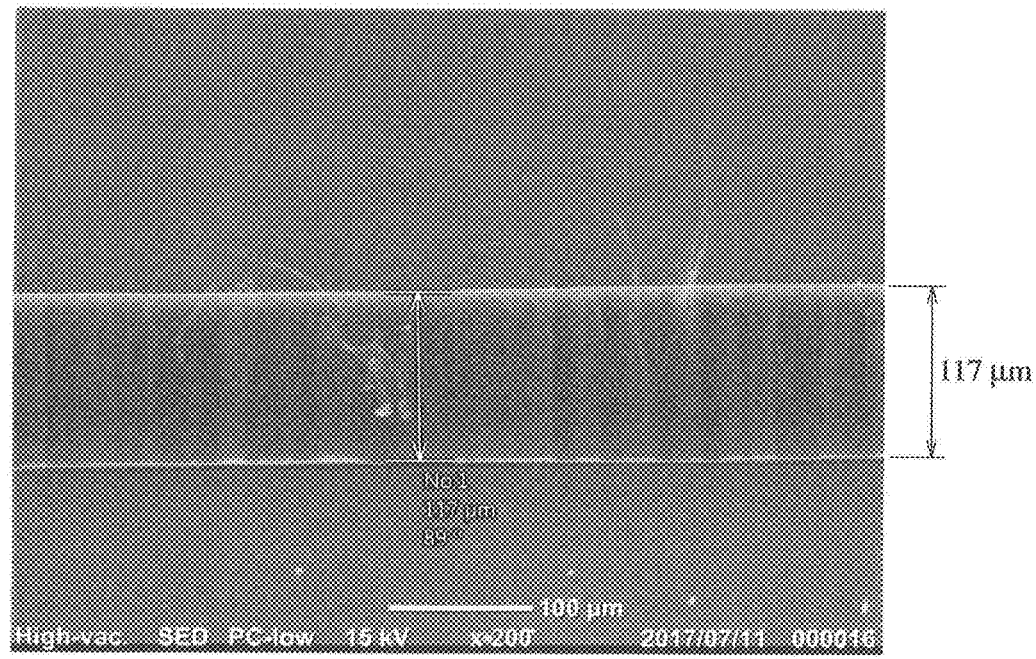
FIG. 16(a) is a SEM photograph showing the carbon nanotube array of Sample 101.
Figure 16B:
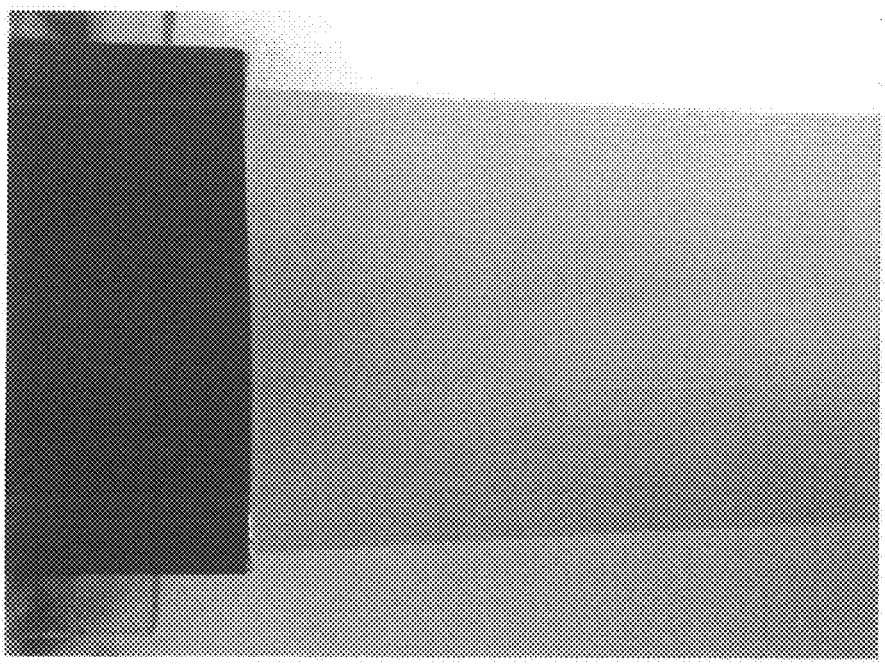
FIG. 16(b) is a photograph showing fibers drawn from the carbon nanotube array of Sample 101.
Figure 17A:
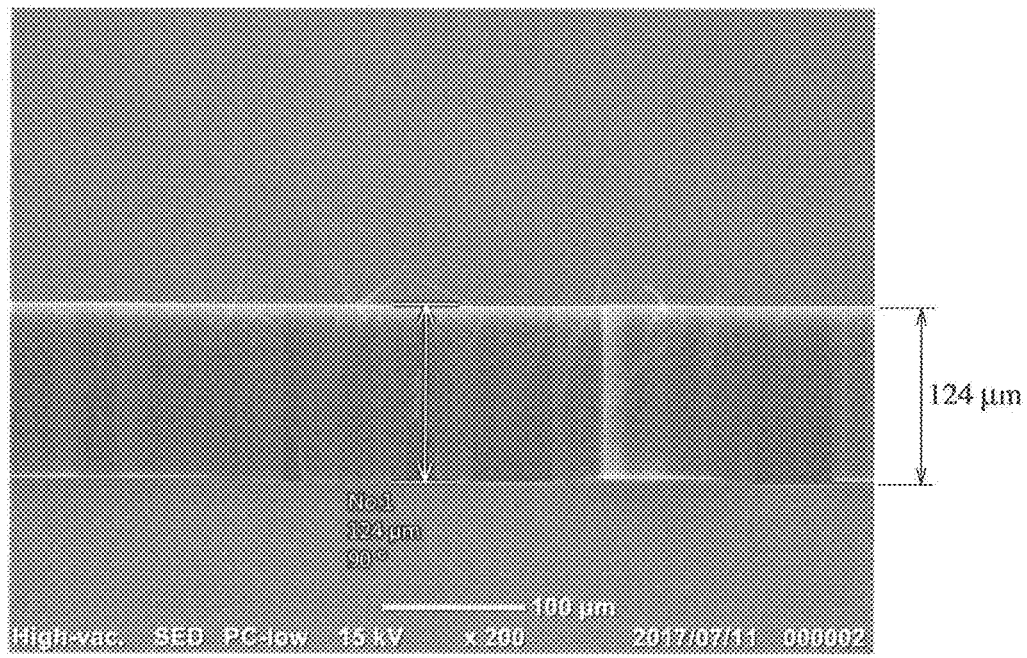
FIG. 17(a) is a SEM photograph showing the carbon nanotube array of Sample 102.
Figure 17B:
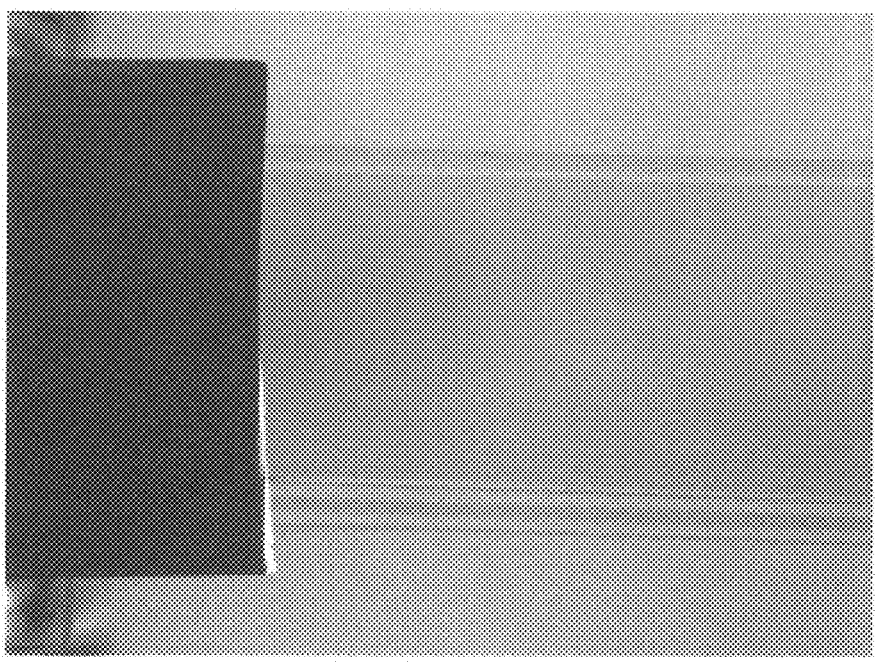
FIG. 17(b) is a photograph showing fibers drawn from the carbon nanotube array of Sample 102.
Figure 18A:
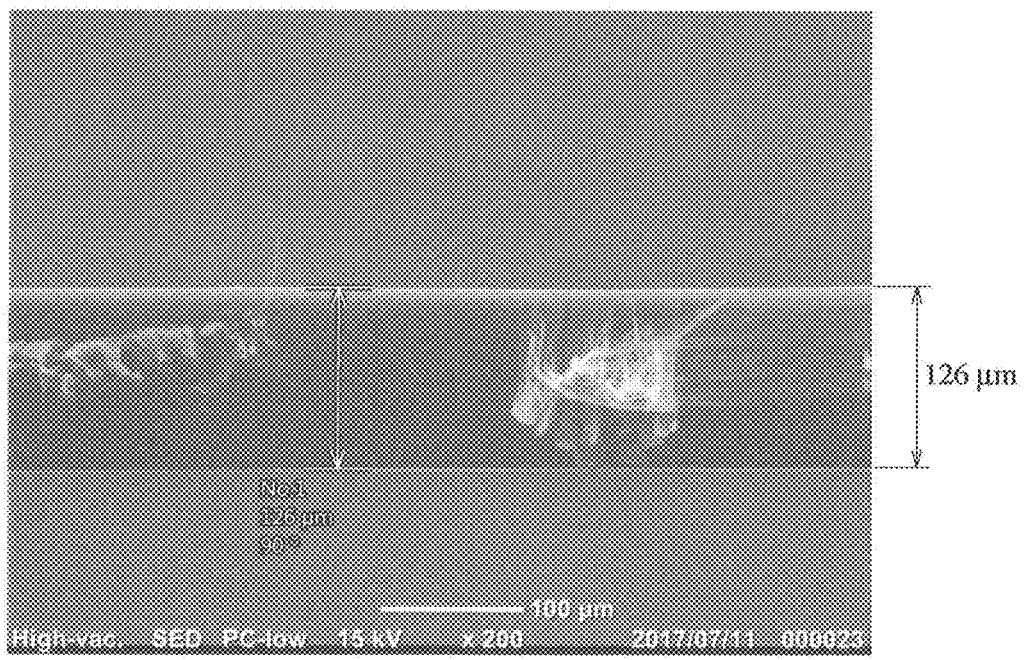
FIG. 18(a) is a SEM photograph showing the carbon nanotube array of Sample 103.
Figure 18B:
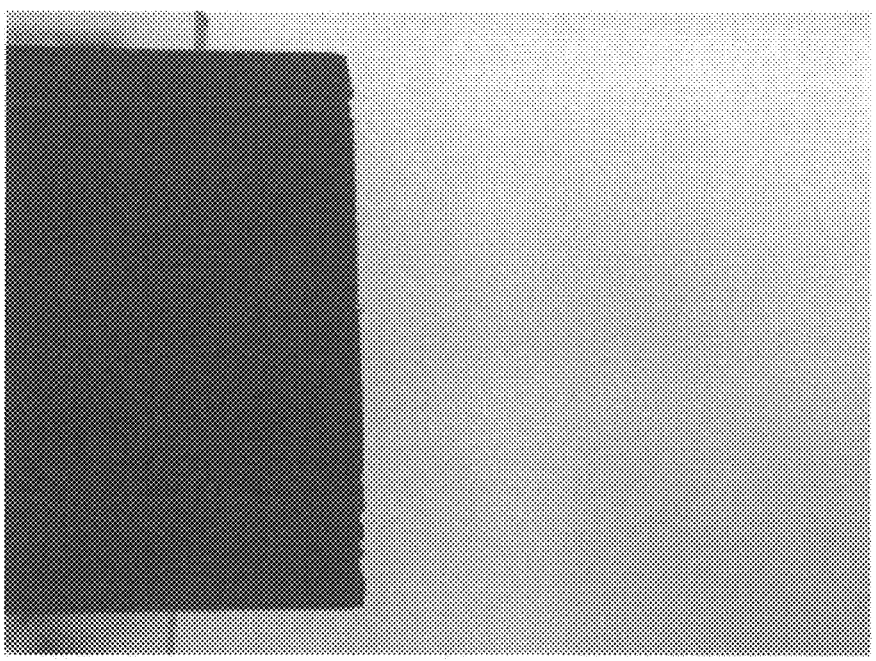
FIG. 18(b) is a photograph showing fibers drawn from the carbon nanotube array of Sample 103.
Figure 19A:
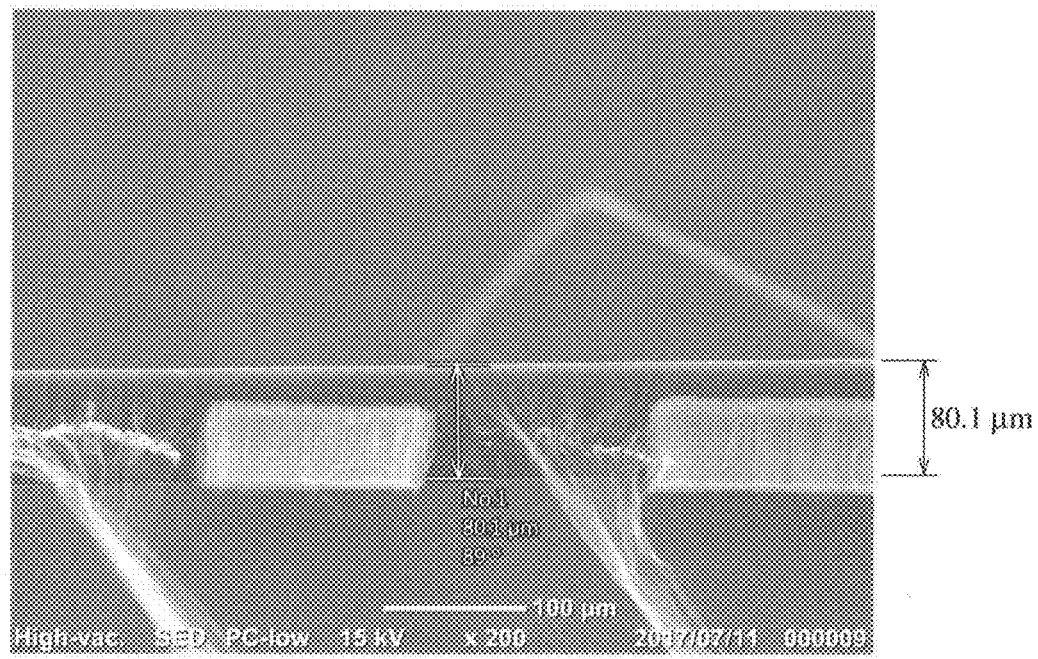
FIG. 19(a) is a SEM photograph showing the carbon nanotube array of Sample 104.
Figure 19B:
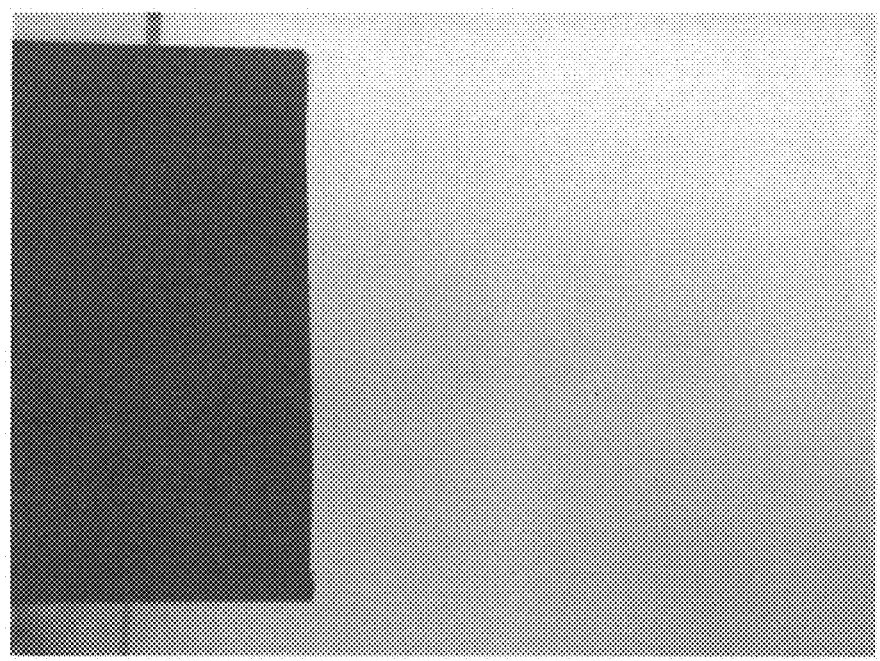
FIG. 19(b) is a photograph showing fibers drawn from the carbon nanotube array of Sample 104.

Samples with * are Comparative Examples.
Good: A spun yarn of 1 m or more was obtained.
Fair: A spun yarn of less than 1 m was obtained.
Poor: Could not be spun The SEM photographs of the carbon nanotube arrays of Samples 101-104 are shown in FIGS. 16(*a*), 17(*a*), 18(*a*) and 19(*a*), and carbon nanotube fibers drawn from them are shown in FIGS. 16(*b*), 17(*b*), 18(*b*) and 19(*b*). In Samples 101 and 102 (the present invention), pluralities of fibers were uniformly formed from the carbon nanotube arrays without disconnection and spun into yarns of 40 m or more, exhibiting good spinnability. In Samples 103 and 104 (Comparative Examples), on the other hand, continuous fibers were not formed from the carbon nanotube arrays, so that spinning was impossible. As is clear from the comparison of FIGS. 16(*a*) and 19(*a*), the carbon nanotubes of Sample 104 (Comparative Example) were shorter than those of Sample 101 (the present invention), presumably because decomposition (oxidation) occurred in the former carbon nanotubes subjected to a heat treatment in an air atmosphere.

Example 2

The carbon nanotube arrays of Samples 201 to 217 were produced in the same manner as in Sample 101 except for changing the heat treatment conditions (temperature and time) as shown in Table 2. Incidentally, Sample 205 was the same as Sample 101. Spun yarns were produced from the carbon nanotube arrays of Samples 201-217 in the same manner as in Example 1 to evaluate spinnability. The evaluation results are shown in Table 2.

TABLE 2

| Sample | Heat Treatment Conditions of CNT | Formula (1) | Formula (2) | Formula (3) | Spinnability |
|---|---|---|---|---|---|
| 201 | 900° C., 10 min. | Yes | Yes | Yes | Good |
| 202 | 900° C., 3 min. | Yes | Yes | Yes | Good |
| 203 | 900° C., 0.7 min. | Yes | Yes | Yes | Fair |
| 204 | 800° C., 60 min. | Yes | Yes | Yes | Good |
| 205* | 800° C., 10 min. | Yes | Yes | Yes | Good |
| 206 | 800° C., 5 min. | Yes | Yes | Yes | Good |
| 207 | 800° C., 1 min. | Yes | Yes | No | Fair |
| 208 | 700° C., 30 min. | Yes | Yes | Yes | Good |
| 209 | 700° C., 10 min. | Yes | Yes | No | Fair |
| 210 | 700° C., 3 min. | Yes | Yes | No | Fair |
| 211 | 600° C., 10 min. | Yes | Yes | No | Fair |
| 212 | 600° C., 5 min. | Yes | Yes | No | Fair |
| 213 | 550° C., 30 min. | Yes | Yes | No | Fair |
| 214 | 550° C., 20 min. | Yes | Yes | No | Fair |
| 215 | 500° C., 60 min. | Yes | Yes | No | Fair |
| 216 | 500° C., 30 min. | Yes | Yes | No | Fair |
| 217 | 500° C., 20 min. | Yes | Yes | No | Fair |

Note:
The formula (1) is $t \geq 18{,}000 \times [1/(T + 273)] - 17$.
The formula (2) is $t \geq 30{,}000 \times [1/(T + 273)] - 28$.
The formula (3) is $t \geq 230{,}000 \times [1/(T + 273)] - 210$.
"Yes" means that the formula was met, and
"No" means that the formula was not met.
*Sample 205 corresponds to Sample 101.
The spinnability is expressed by the following standard.
Good: A spun yarn of 40 m or more was obtained.
Fair: A spun yarn of less than 1 m was obtained.
Poor: Could not be spun.

Figure 20A:
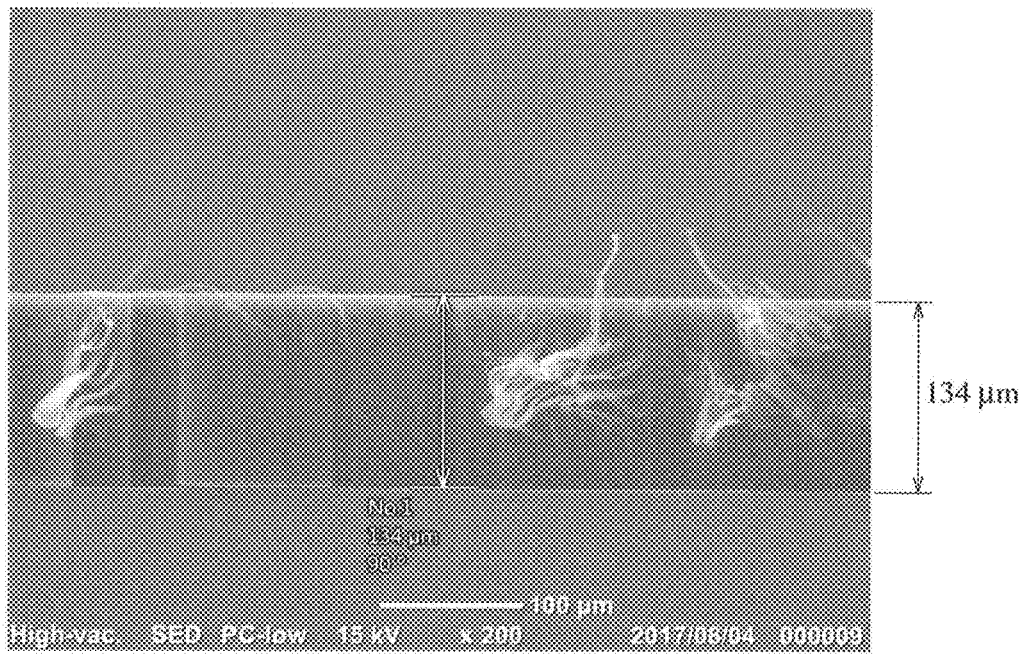
FIG. 20(a) is a SEM photograph showing the carbon nanotube array of Sample 201.
Figure 20B:
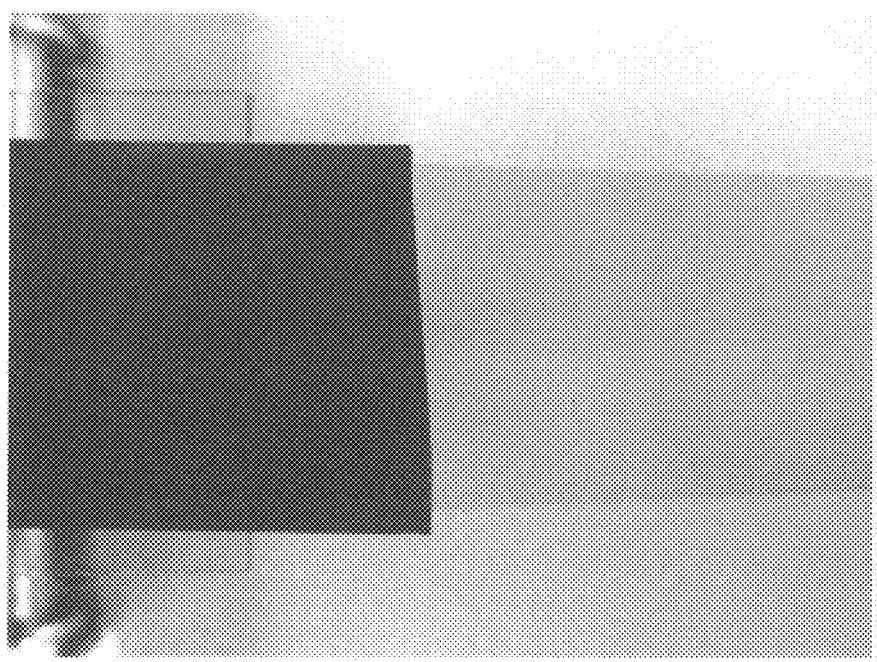
FIG. 20(b) is a photograph showing fibers drawn from the carbon nanotube array of Sample 201.
Figure 21A:
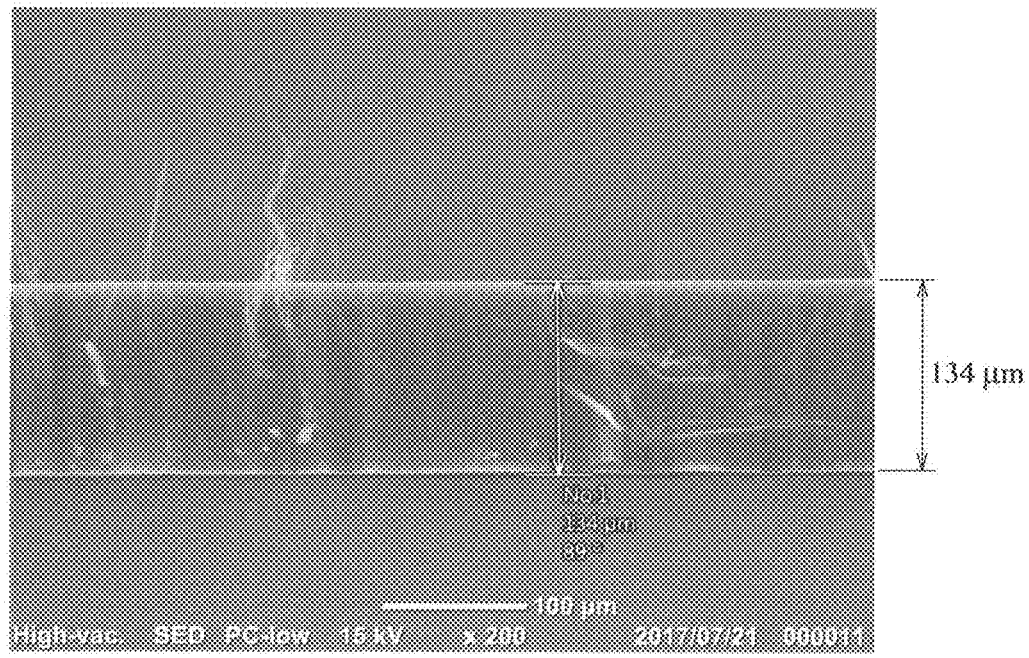
FIG. 21(a) is a SEM photograph showing the carbon nanotube array of Sample 202.
Figure 21B:
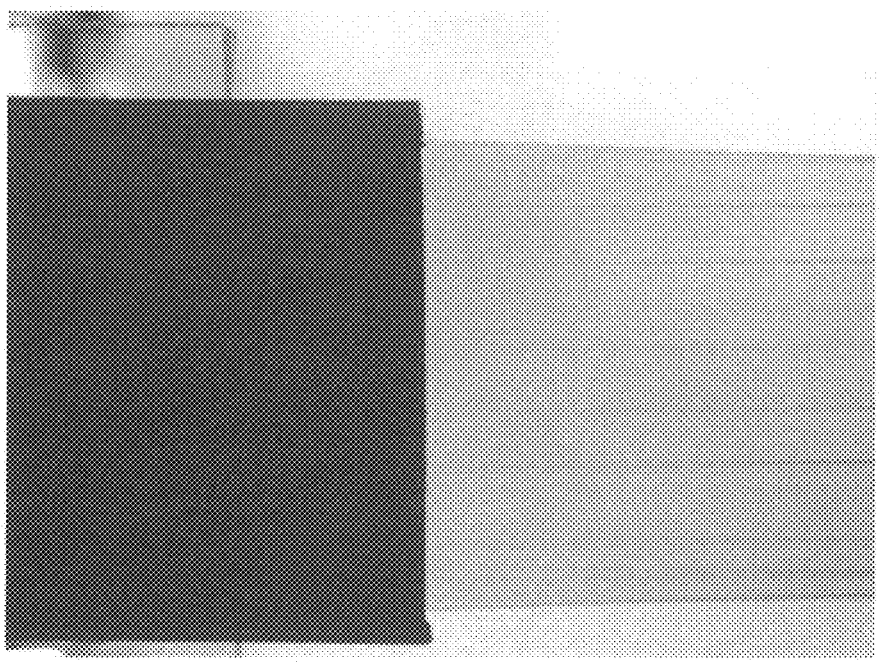
FIG. 21(b) is a photograph showing fibers drawn from the carbon nanotube array of Sample 202.
Figure 22A:
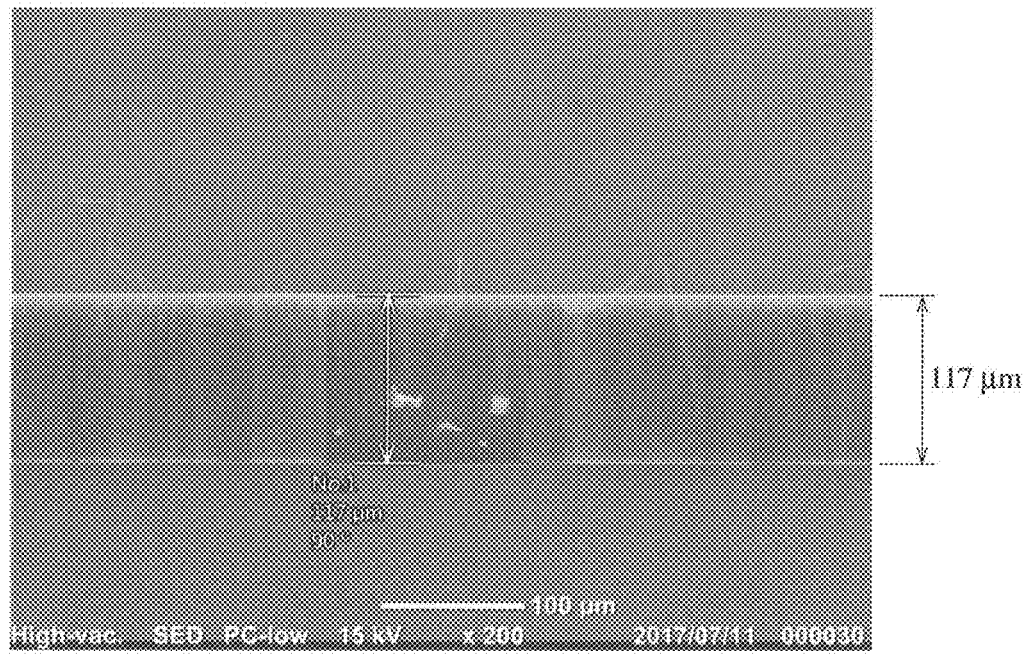
FIG. 22(a) is a SEM photograph showing the carbon nanotube array of Sample 204.
Figure 22B:
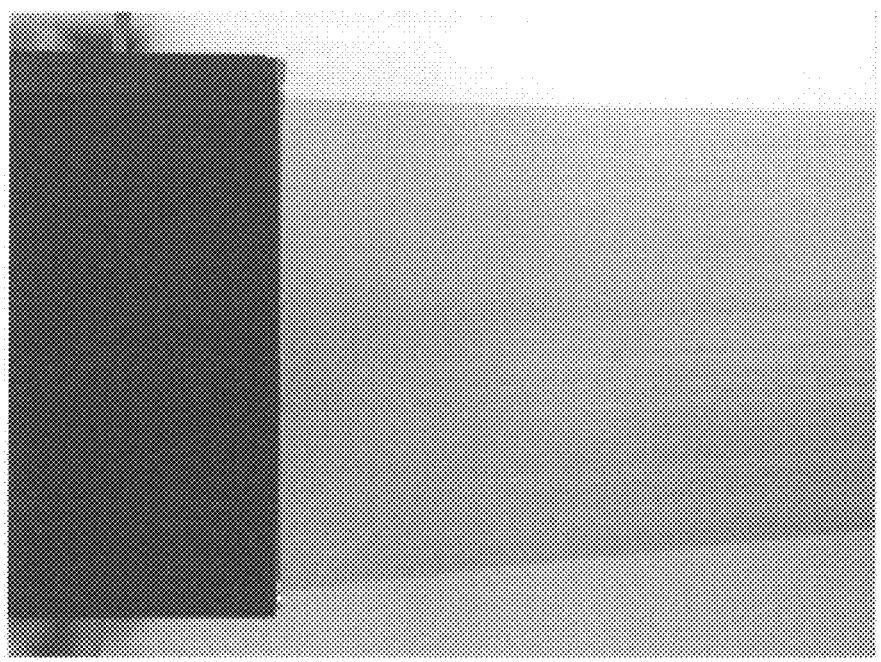
FIG. 22(b) is a photograph showing fibers drawn from the carbon nanotube array of Sample 204.
Figure 23:
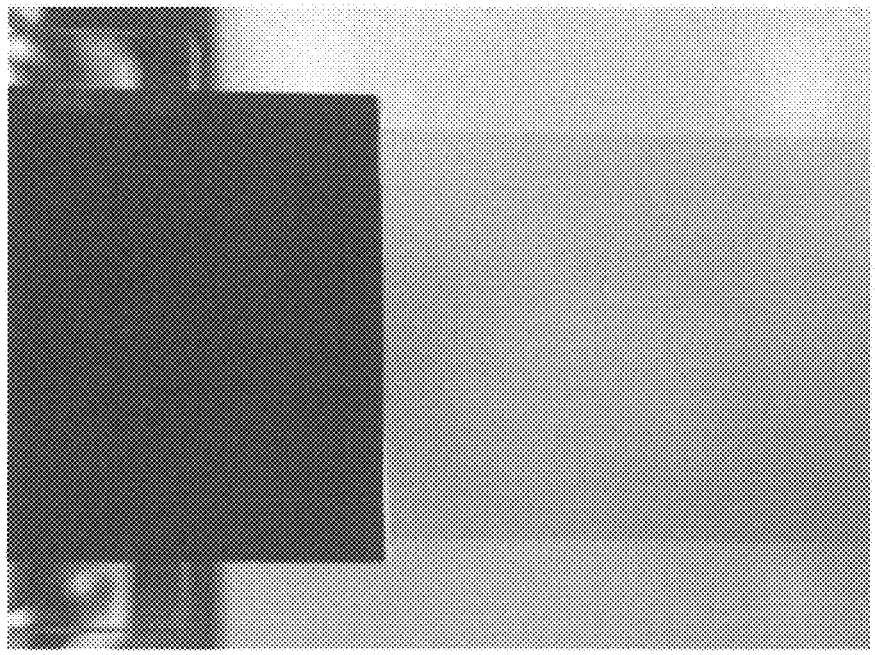
FIG. 23 is a photograph showing fibers drawn from the carbon nanotube array of Sample 401.
Figure 24A:
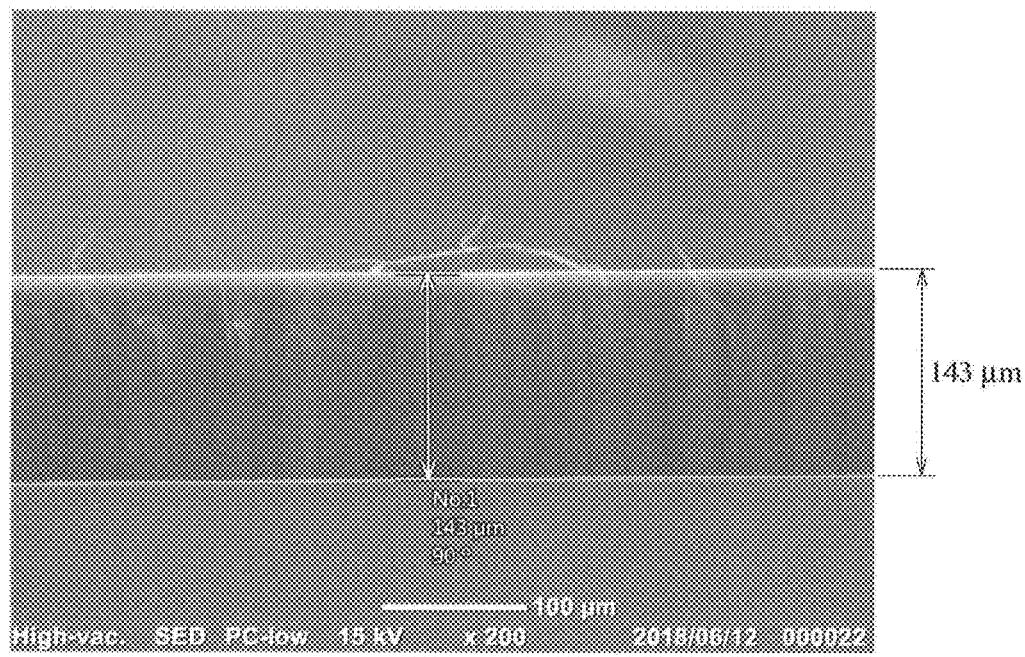
FIG. 24(a) is a SEM photograph showing the carbon nanotube array of Sample 402.
Figure 24B:
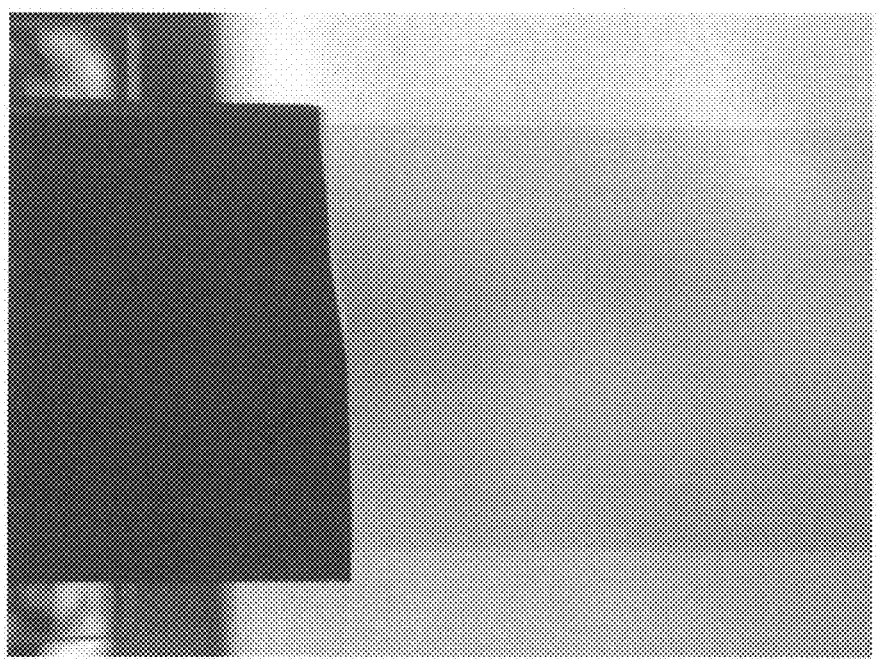
FIG. 24(b) is a photograph showing fibers drawn from the carbon nanotube array of Sample 402.
Figure 25A:
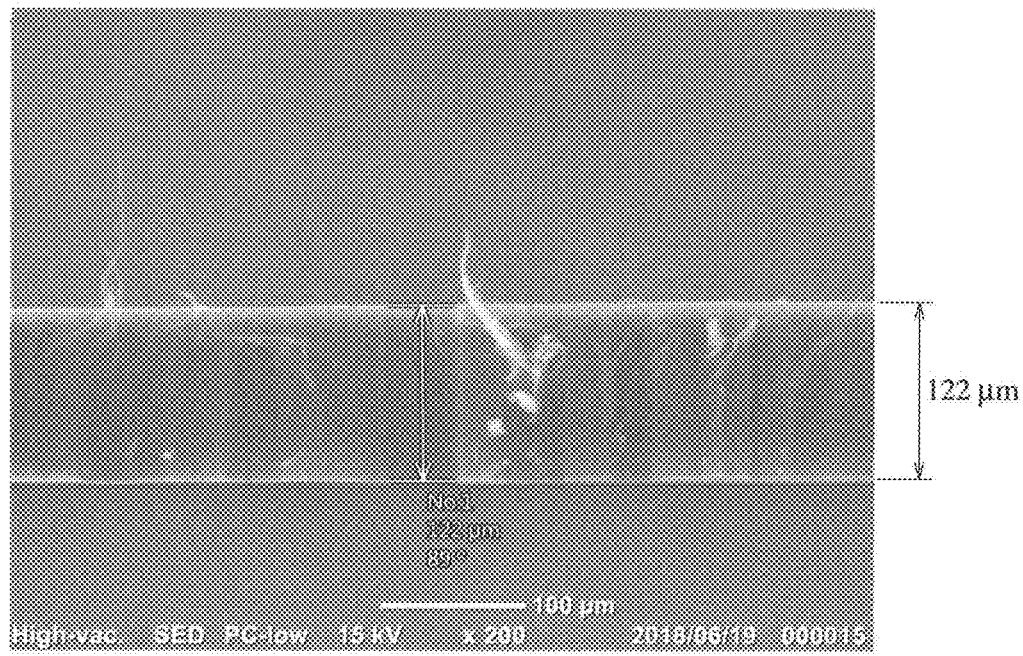
FIG. 25(a) is a SEM photograph showing the carbon nanotube array of Sample 403.
Figure 25B:
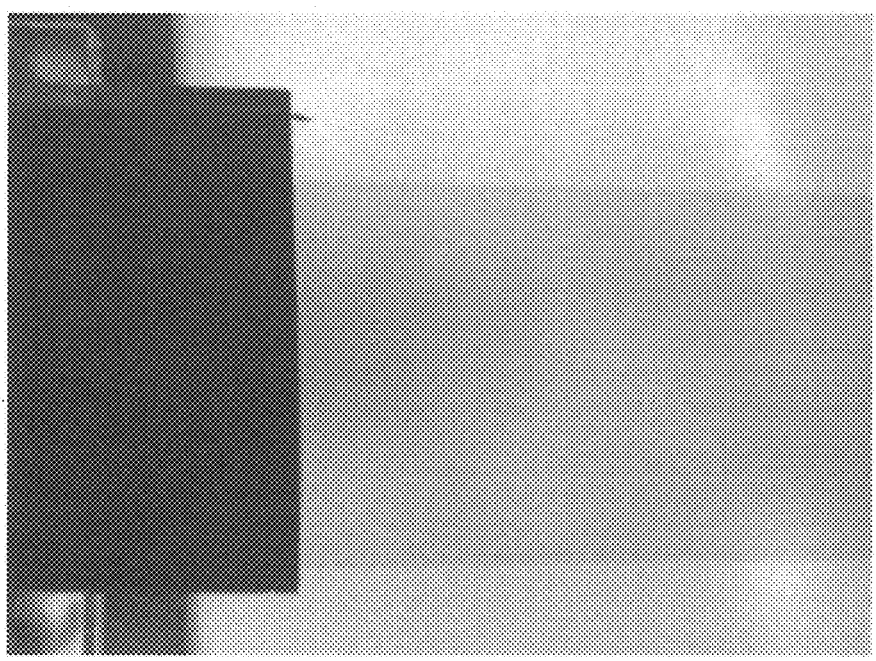
FIG. 25(b) is a photograph showing fibers drawn from the carbon nanotube array of Sample 403.
Figure 26:
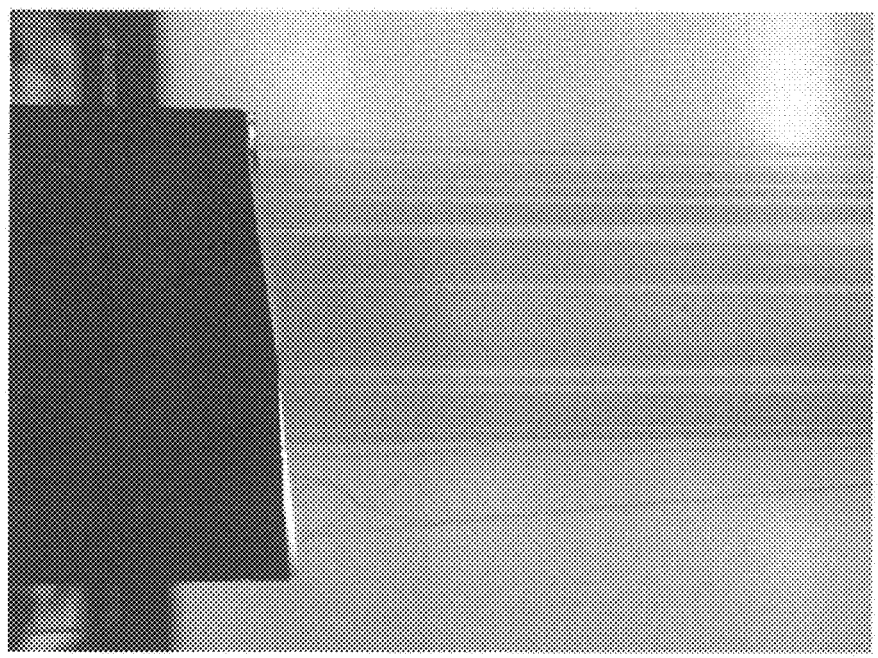
FIG. 26 is a photograph showing fibers drawn from the carbon nanotube array of Sample 404.
Figure 27A:
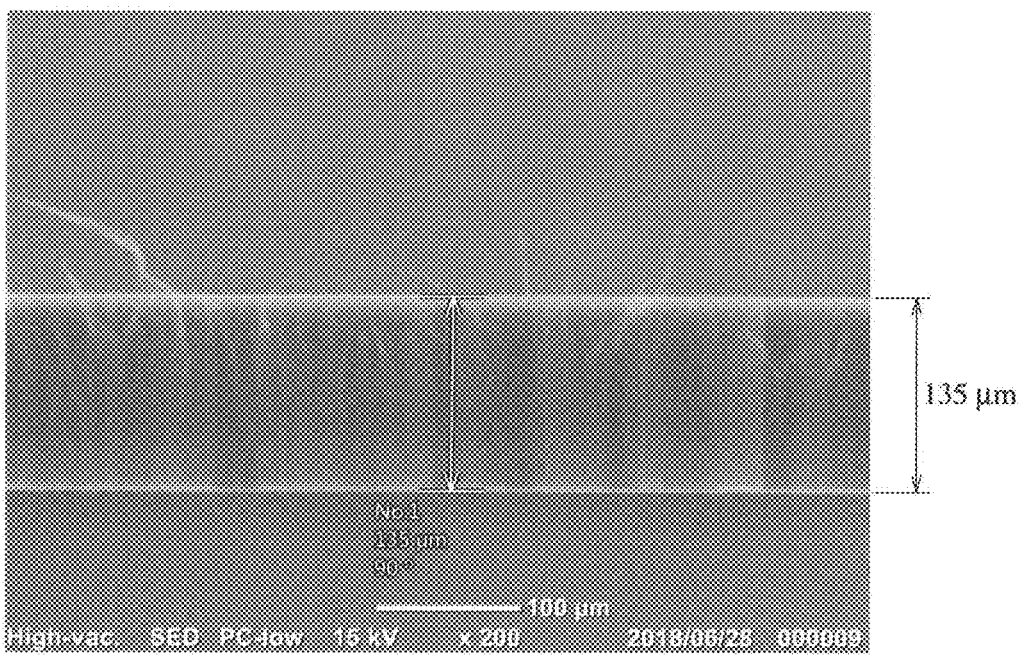
FIG. 27(a) is a SEM photograph showing the carbon nanotube array of Sample 405.
Figure 27B:
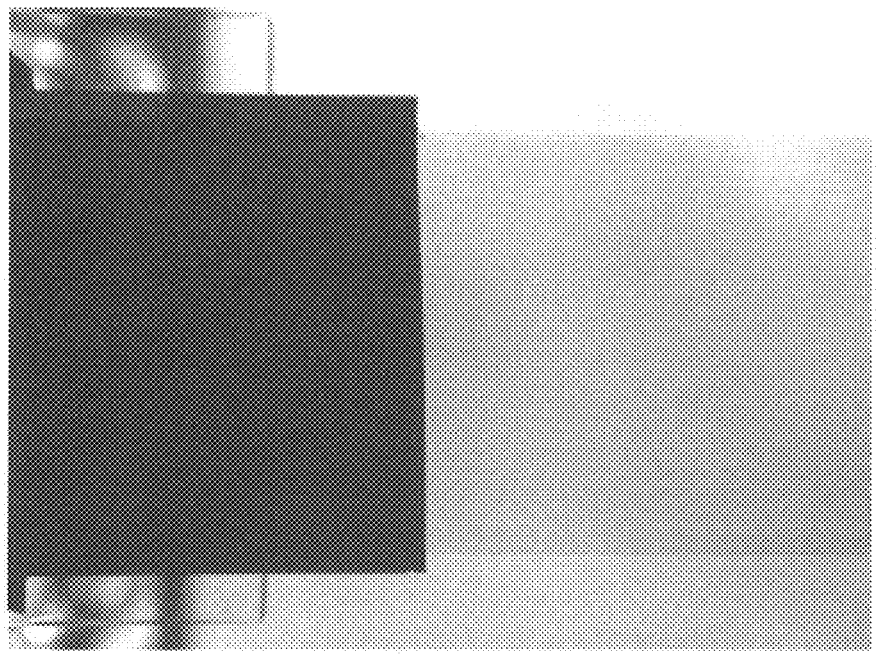
FIG. 27(b) is a photograph showing fibers drawn from the carbon nanotube array of Sample 405.
Figure 28:
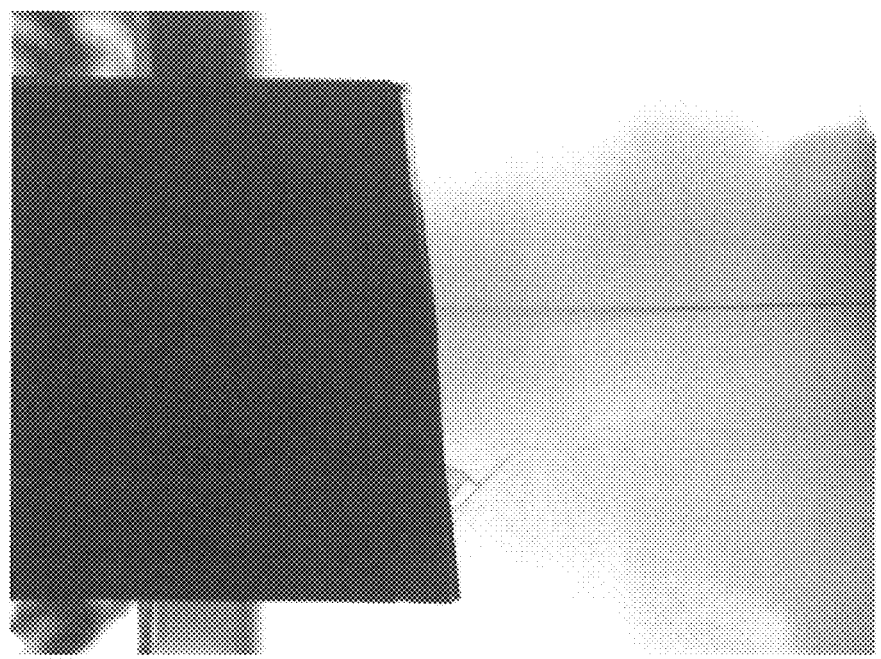
FIG. 28 is a photograph showing fibers drawn from the carbon nanotube array of Sample 406.
Figure 29A:
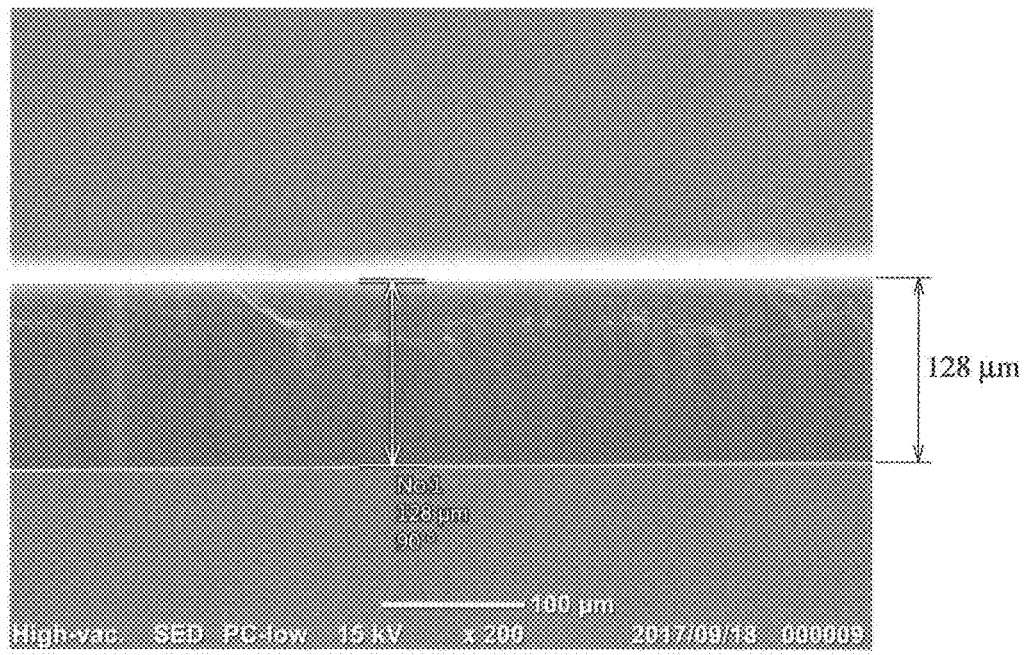
FIG. 29(a) is a SEM photograph showing the carbon nanotube array of Sample 407.
Figure 29B:
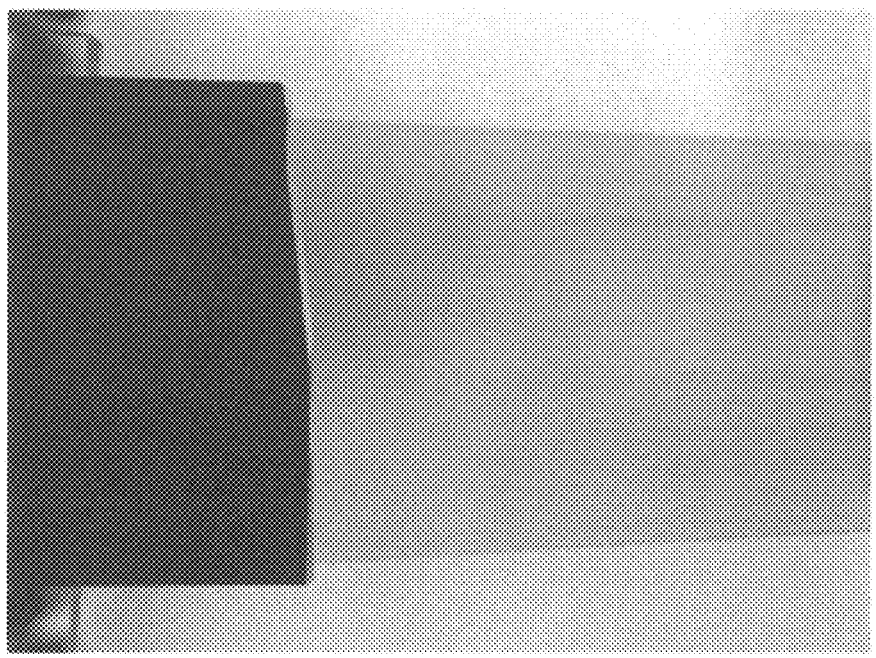
FIG. 29(b) is a photograph showing fibers drawn from the carbon nanotube array of Sample 407.

The SEM photographs of the carbon nanotube arrays of Samples 201, 202 and 204 are shown in FIGS. 20(*a*), 21(*a*) and 22(*a*), respectively, and carbon nanotube fibers drawn from them are shown in FIGS. 20(*b*), 21(*b*) and 22(*b*), respectively. These figures indicate that carbon nanotube fibers were uniformly formed from the carbon nanotube arrays of Samples 201, 202 and 204 without disconnection, exhibiting good spinnability. Any of Samples 201, 202, 204, 205, 206 and 208 provided a spun yarn of 40 m or more, exhibiting excellent spinnability. The other carbon nanotube arrays of Samples 203, 207 and 209 to 217 provided spun yarns of less than 1 m.

Example 3

To evaluate the reproducibility of spinnability, the carbon nanotube arrays of Samples 301-312 were produced under the same conditions as in Sample 101. The lengths (average heights of the carbon nanotube arrays) of these carbon nanotubes, and the lengths of spun yarns obtained by spinning were measured. The results are shown in Table 3.

TABLE 3

| | Length | |
|---|---|---|
| Sample | CNT (μm) | Spun Yarn (m) |
| 301 | 184 | 45.9 |
| 302 | 159 | 37.7 |
| 303 | 160 | 42.1 |
| 304 | 193 | 49.1 |
| 305 | 179 | 50.9 |
| 306 | 179 | 57.1 |
| 307 | 156 | 46.5 |
| 308 | 162 | 44.0 |
| 309 | 166 | 44.5 |
| 310 | 169 | 47.5 |
| 311 | 181 | 49.4 |
| 312 | 133 | 37.1 |
| Average | 186 | 46.0 |

Spun yarns obtained from the resultant 12 carbon nanotube arrays were as long as 37-57 m (46 m on average). This indicates that carbon nanotube arrays having excellent spinnability were obtained by the method of the present invention with very good reproducibility.

Example 4

Sample 401 (The Present Invention)
A carbon nanotube array was produced in the same manner as in Sample 101, except for changing the synthesis temperature (keeping temperature in the third step) and heat treatment temperature of carbon nanotubes to 835° C. and 870° C., respectively.

Sample 402 (The Present Invention)
A carbon nanotube array was produced in the same manner as in Sample 401, except that with a nitrogen gas supplied simultaneously with stopping the synthesis by stopping the supply of an acetylene gas, the heat treatment was conducted in a mixed gas atmosphere of a hydrogen gas and a nitrogen gas (entire pressure: 800 Pa). The mixing ratio of the hydrogen gas to the nitrogen gas was 346:346 (molar ratio of hydrogen: 0.5). The mixing ratio of two gases is a gas flow rate (sccm) ratio (same below).

Sample 403 (The Present Invention)
A carbon nanotube array was produced in the same manner as in Sample 402, except for changing the mixing ratio of the hydrogen gas to the nitrogen gas to 173:519 (molar ratio of hydrogen: 0.25).

Sample 404 (The Present Invention)
A carbon nanotube array was produced in the same manner as in Sample 402 except for changing the mixing ratio of the hydrogen gas to the nitrogen gas to 69:623 (molar ratio of hydrogen: 0.1).

Sample 405 (The Present Invention)
A carbon nanotube array was produced in the same manner as in Sample 402 except for changing the heat treatment temperature to 900° C., and the mixing ratio of the hydrogen gas to the nitrogen gas to 69:623 (molar ratio of hydrogen: 0.1).

Sample 406 (Comparative Example)

A carbon nanotube array was produced in the same manner as in Sample 402, except that the heat treatment was conducted in an atmosphere of 100% nitrogen (pressure: 800 Pa).

Sample 407 (The Present Invention)

A carbon nanotube array was produced in the same manner as in Sample 401 except for changing the heat treatment temperature and time to 700° C. and 30 minutes, respectively.

The synthesis temperatures and heat treatment conditions of carbon nanotubes in Samples 401-407 are shown in Table 4.

Spun yarns were produced from the carbon nanotube arrays of Samples 401-407 in the same manner as in Example 1, to evaluate spinnability. The evaluation results are shown in Table 4 and FIG. 13. A dotted line in FIG. 13 is expressed by the formula of $T=-190 \times X_{H2}+890$, wherein $X_{H2}$ represents a molar ratio of hydrogen). It is clear that the molar ratio of hydrogen and the heat treatment temperature selected in a region on or above the dotted line (expressed by the formula of $T \geq -190 \times X_{H2}+890$) provided carbon nanotube arrays having good spinnability.

TABLE 4

| | CNT | | | | |
|---|---|---|---|---|---|
| | | Heat Treatment Conditions | | | |
| Sample | Synthesis Temperature | $X_{H2}$[1] | $X_{N2}$[1] | Temperature/ Time | Spinnability[2] |
| 401 | 835° C. | 1 | 0 | 870° C./ 10 minutes | Good |
| 402 | 800° C. | 0.5 | 0.5 | 870° C./ 10 minutes | Good |
| 403 | 800° C. | 0.25 | 0.75 | 870° C./ 10 minutes | Good |
| 404 | 800° C. | 0.1 | 0.9 | 870° C./ 10 minutes | Good |
| 405 | 800° C. | 0.1 | 0.9 | 900° C./ 10 minutes | Good |
| 406* | 800° C. | 0 | 1 | 870° C./ 10 minutes | Poor |
| 407 | 835° C. | 1 | 0 | 700° C./ 30 minutes | Good |

Note
[1] $X_{H2}$ represents a molar ratio of hydrogen, and $X_{N2}$ represents a molar ratio of nitrogen.
Sample with * is Comparative Example.
[2] The spinnability is expressed by the following standard.
Good: A spun yarn of 1 m or more was obtained.
Fair: A spun yarn of less than 1 m was obtained.
Poor: Could not be spun.

The SEM photographs of the carbon nanotube arrays of Samples 402, 403, 405 and 407 are shown in FIGS. 24(a), 25(a), 27(a) and 29(a), respectively, and the spinnability evaluation results of Samples 401-407 are shown in FIGS. 23, 24(b), 25(b), 26, 27(b), 28 and 29(b), respectively. As is clear from these results, in Sample 401 (molar ratio of hydrogen: 1), Sample 402 (molar ratio of hydrogen: 0.5) and Sample 403 (molar ratio of hydrogen: 0.25), pluralities of fibers were formed uniformly without disconnection, exhibiting good spinnability. In Sample 404 in which the heat treatment temperature was 870° C., and the molar ratio of hydrogen was 0.1, pluralities of fibers were slightly partially disconnected, but Sample 405 in which the heat treatment temperature was elevated to 900° C. exhibited good spinnability even though the molar ratio of hydrogen was 0.1. On the other hand, the carbon nanotube array of Sample 406 (Comparative Example) heat-treated in a 100%-nitrogen atmosphere was hardly spun.

Example 5

Carbon nanotube arrays were produced in the same manner as in Example 1 except for changing the heat treatment temperature and time as shown in Table 5, and spun yarns were produced to evaluate spinnability. The results are shown in Table 5 and FIG. 14.

TABLE 5

| Sample | Heat Treatment Temperature T (° C.) | $[1/(T + 273)]$[1] $(K^{-1})$ | Heat Treatment Time t (minute) | Spinnability[2] |
|---|---|---|---|---|
| 501 | 500 | 0.001294 | 10 | Poor |
| 502 | 550 | 0.001215 | 10 | Poor |
| 503 | 600 | 0.001145 | 3 | Poor |
| 504 | 400 | 0.001486 | 10 | Fair |
| 505 | 400 | 0.001486 | 20 | Fair |
| 506 | 400 | 0.001486 | 30 | Fair |
| 507 | 400 | 0.001486 | 60 | Fair |
| 508 | 500 | 0.001294 | 20 | Fair |
| 509 | 500 | 0.001294 | 30 | Fair |
| 510 | 500 | 0.001294 | 60 | Fair |
| 511 | 550 | 0.001215 | 20 | Fair |
| 512 | 550 | 0.001215 | 30 | Fair |
| 513 | 600 | 0.001145 | 5 | Fair |
| 514 | 600 | 0.001145 | 10 | Fair |
| 515 | 700 | 0.001028 | 3 | Fair |
| 516 | 700 | 0.001028 | 10 | Fair |
| 517 | 600 | 0.001145 | 30 | Fair |
| 518 | 600 | 0.001145 | 60 | Fair |
| 519 | 700 | 0.001028 | 30 | Good |
| 520 | 800 | 0.000932 | 5 | Good |
| 521 | 800 | 0.000932 | 10 | Good |
| 522 | 900 | 0.000853 | 3 | Good |
| 523 | 900 | 0.000853 | 10 | Good |
| 524 | 700 | 0.001028 | 30 | Good |

Note:
[1] A reciprocal number of the heat treatment temperature T (° C.) expressed by absolute temperature.
[2] The spinnability is expressed by the following standard.
Good: A spun yarn of 1 m or more was obtained.
Fair: A spun yarn of less than 1 m was obtained.
Poor: Could not be spun.

In FIG. 14, a straight line 1 is expressed by the formula of $t=18,000 \times [1/(T+273)]-17$, a straight line 2 is expressed by the formula of $t=30,000 \times [1/(T+273)]-28$, and a straight line 3 is expressed by the formula of $t=230,000 \times [1/(T+273)]-210$. Below the straight line 1 is an unspinnable region, on or above the straight line 1 (expressed by the formula (1) of $t \geq 18,000 \times [1/(T+273)]-17$) is a spinnable region, on or above the straight line 2 (expressed by the formula (2) of $t \geq 30,000 \times [1/(T+273)]-28$) is a region of good spinnability, and on or above the straight line 3 (expressed by the formula (3) of $t \geq 230,000 \times [1/(T+273)]-210$) is a region of excellent spinnability.

Example 6

Carbon nanotube arrays were produced in the same manner as in Example 1 except for changing the heat treatment temperature and time as shown in Tables 6-1 and 6-2, and the average lengths (average heights of the carbon nanotube arrays) and bulk densities of carbon nanotubes were measured. Further, spun yarns were produced from these carbon nanotube arrays in the same manner as in Example 1, and spinnability was evaluated by the lengths of the spun yarns. The results are shown in Tables 6-1 and 6-2.

Black circle: A spun yarn of 40 m or more was obtained.
White circle: A spun yarn of 35 m or more and less than 40 m was obtained.
Black square: A spun yarn of 30 m or more and less than 35 m was obtained.
White triangle: A spun yarn of less than 1 m was obtained.
Cross: Could not be spun.

TABLE 6-1

| Sample | Heat Treatment | | Carbon Nanotube Array | | |
|---|---|---|---|---|---|
| | Temperature (° C.) | Time (min) | Average Height (μm) | Bulk Density (mg/cm³) | Spinnability |
| 601 | 850 | 10 | 141 | 163 | Not Spun |
| 602 | 850 | 10 | 91.4 | 225 | Not Spun |
| 603 | 850 | 10 | 178 | 123 | <1 m |
| 604 | 850 | 10 | 183 | 116 | <1 m |
| 605 | 850 | 10 | 173 | 136 | <1 m |
| 606 | 850 | 10 | 101 | 165 | <1 m |
| 607 | 850 | 10 | 154 | 138 | <1 m |
| 608 | 850 | 10 | 206 | 108 | <1 m |
| 609 | 850 | 10 | 162 | 129 | <1 m |
| 610 | 850 | 10 | 189 | 137 | <1 m |
| 611 | 850 | 10 | 193 | 129 | <1 m |
| 612 | 850 | 10 | 148 | 128 | 30-35 m |
| 613 | 850 | 10 | 128 | 135 | 30-35 m |
| 614 | 850 | 10 | 157 | 131 | 30-35 m |
| 615 | 850 | 10 | 161 | 123 | 35-40 m |
| 616 | 850 | 10 | 149 | 134 | 35-40 m |
| 617 | 850 | 10 | 139 | 126 | 35-40 m |
| 618 | 850 | 10 | 136 | 132 | 35-40 m |
| 619 | 850 | 10 | 137 | 122 | 35-40 m |
| 620 | 850 | 10 | 133 | 154 | 35-40 m |
| 621 | 850 | 10 | 138 | 139 | 35-40 m |
| 622 | 850 | 10 | 126 | 176 | 35-40 m |
| 623 | 850 | 10 | 132 | 164 | 35-40 m |
| 624 | 850 | 10 | 131 | 164 | 35-40 m |
| 625 | 850 | 10 | 159 | 138 | ≥40 m |
| 626 | 850 | 10 | 137 | 153 | ≥40 m |
| 627 | 850 | 10 | 136 | 151 | ≥40 m |
| 628 | 850 | 10 | 136 | 145 | ≥40 m |
| 629 | 850 | 10 | 158 | 146 | ≥40 m |
| 630 | 850 | 10 | 163 | 142 | ≥40 m |

TABLE 6-2

| Sample | Heat Treatment | | Carbon Nanotube Array | | |
|---|---|---|---|---|---|
| | Temperature (° C.) | Time (min) | Average Height (μm) | Bulk Density (mg/cm³) | Spinnability |
| 631 | 850 | 10 | 171 | 146 | ≥40 m |
| 632 | 850 | 10 | 147 | 146 | ≥40 m |
| 633 | 850 | 10 | 141 | 145 | ≥40 m |
| 634 | 850 | 10 | 157 | 136 | ≥40 m |
| 635 | 850 | 10 | 138 | 149 | ≥40 m |
| 636 | 850 | 10 | 142 | 159 | ≥40 m |
| 637 | 850 | 10 | 145 | 151 | ≥40 m |
| 638 | 850 | 10 | 151 | 146 | ≥40 m |
| 639 | 850 | 10 | 136 | 159 | ≥40 m |
| 640 | 850 | 10 | 141 | 146 | ≥40 m |
| 641 | 850 | 10 | 143 | 154 | ≥40 m |
| 642 | 850 | 10 | 134 | 165 | ≥40 m |
| 643 | 850 | 10 | 140 | 159 | ≥40 m |
| 644 | 850 | 10 | 138 | 168 | ≥40 m |
| 645 | 850 | 10 | 141 | 159 | ≥40 m |
| 646 | 850 | 10 | 128 | 161 | ≥40 m |
| 647 | 850 | 10 | 193 | 133 | ≥40 m |
| 648 | 850 | 10 | 131 | 147 | ≥40 m |
| 649 | 850 | 10 | 129 | 166 | ≥40 m |
| 650 | 850 | 10 | 145 | 143 | ≥40 m |
| 651 | 850 | 10 | 133 | 151 | ≥40 m |
| 652 | 850 | 10 | 157 | 150 | ≥40 m |

TABLE 6-2-continued

| Sample | Heat Treatment | | Carbon Nanotube Array | | |
|---|---|---|---|---|---|
| | Temperature (° C.) | Time (min) | Average Height (μm) | Bulk Density (mg/cm³) | Spinnability |
| 653 | 850 | 10 | 155 | 152 | ≥40 m |
| 654 | 850 | 10 | 152 | 150 | ≥40 m |
| 655 | 850 | 10 | 153 | 142 | ≥40 m |

The relation between the average length (average height of the carbon nanotube array) and bulk density of carbon nanotubes and the length of a spun carbon nanotube yarn is shown in FIG. 3, in which a spun yarn of 40 m or more is shown by a black circle, a spun yarn of 35 m or more and less than 40 m is shown by a white circle, a spun yarn of 30 m or more and less than 35 m is shown by a black square, a spun yarn of less than 1 m is shown by a white triangle, and the unspinnable is shown by a cross. As is clear from FIG. 3, to provide the carbon nanotube array with good spinnability, carbon nanotubes on the substrate should have an average length of 100-250 μm and a bulk density of 100-200 mg/cm³, preferably an average length of 120-220 μm and a bulk density of 120-180 mg/cm³, more preferably an average length of 130-200 μm and a bulk density of 130-170 mg/cm³.

FIG. 3 also indicates that longer carbon nanotubes tend to have a lower bulk density. It is considered that the varied average lengths and bulk densities of carbon nanotubes were due to fluctuating conditions in the apparatus during the synthesis of carbon nanotubes. Carbon nanotubes on the substrate outside the ranges of 100-250 μm in average length and 100-200 mg/cm³ in bulk density exhibited poor spinnability even after the above heat treatment.

The carbon nanotube array (Sample 647) with carbon nanotubes having an average length of 193 μm is shown in FIG. 1. Spinning of carbon nanotubes drawn from one side of this carbon nanotube array with tweezers, etc. provided a spun yarn shown in FIG. 2. FIG. 2 indicates undisturbed spinning with substantially no carbon nanotubes projecting from the spun yarn. A spun yarn with such undisturbed surface has high tensile strength.

An amplitude spectrum of the carbon nanotube array of FIG. 4(a) having excellent spinnability (Sample 647) is shown in FIG. 4(b), and an amplitude spectrum of the unspinnable carbon nanotube array (Sample 601) of FIG. 5(a) is shown in FIG. 5(b). As is clear from the comparison of FIGS. 4(b) and 5(b), the amplitude spectrum of the carbon nanotube array having excellent spinnability (Sample 647) has a large horizontal component, while the amplitude spectrum of the unspinnable carbon nanotube array (Sample 601) is relatively isotropic. Namely, carbon nanotubes in the carbon nanotube array having excellent spinnability [FIG. 4(b)] are strongly oriented in a horizontal direction, while those in the unspinnable carbon nanotube array [FIG. 5(b)] are highly randomly oriented.

In a SEM photograph of a carbon nanotube array taken in a cross section parallel to the orientation of carbon nanotubes, a two-dimensional region of 20 μm in width parallel to the substrate (in a horizontal direction) and 8 μm in height from the substrate was subjected to two-dimensional Fourier transform to obtain an amplitude spectrum, and as shown in FIG. 6, a value $f_v$ obtained by integrating the amplitude (line A) from a center of the amplitude spectrum to a spatial frequency of 20 $\mu m^{-1}$ in a horizontal direction (direction of 0°), and a value $f_{20}$ obtained by integrating the amplitude (line B) from a center of the amplitude spectrum to the spatial frequency of 20 μm$^{-1}$ in a direction of 20° were determined to calculate a ratio of $f_{20}$ to $f_v$ ($f_{20}/f_v$). It is said that the smaller the ratio $f_{20}/f_v$, the higher the periodicity of carbon nanotubes in a horizontal direction (carbon nanotubes are vertically regularly arranged). In the amplitude spectrum [FIG. 4(b)] of the carbon nanotube array having excellent spinnability (Sample 647), $f_{20}/f_v$ was 0.29. In the amplitude spectrum [FIG. 5(b)] of the unspinnable carbon nanotube array (Sample 601), $f_{20}/f_v$ was 0.43. Thus, the carbon nanotube array having excellent spinnability (Sample 647) met the condition of $f_{20}/f_v \leq 0.35$, while the unspinnable carbon nanotube array (Sample 601) did not meet the condition of $f_{20}/f_v \leq 0.35$.

EFFECT OF THE INVENTION

Because carbon nanotube arrays obtained by the method of the present invention have excellent spinnability, long, high-quality spun carbon nanotube yarns can be produced therefrom. Because the resultant spun carbon nanotube yarns have excellent strength and electric conductivity, they can be used for substitutes of carbon fibers (reinforcing materials, etc.), strain sensors, electromagnetic wave absorbers, electric wire conductors, artificial muscles, etc.

What is claimed is:

1. A method for producing a carbon nanotube array constituted by a plurality of carbon nanotubes vertically aligned on a substrate, comprising
supplying a carbon source gas into a reaction vessel consisting of a hydrogen gas atmosphere, in which a substrate on which a reaction catalyst comprising metal particles is formed is placed, and keeping a reaction temperature of 500-1100° C. for 0.5-30 minutes to form the carbon nanotube array of vertically aligned carbon nanotubes on said substrate; and
heat-treating said carbon nanotube array by keeping the substrate on which said plurality of carbon nanotubes are formed at 400-900° C. for 0.5-180 minutes in a non-oxidizing atmosphere,
wherein the heat treating of said carbon nanotube array is conducted in a hydrogen gas atmosphere, in a mixed gas atmosphere of a hydrogen gas and an inert gas, or in a vacuum,
said method further comprising, prior to supplying the carbon source gas, heating the substrate on which a metal film is formed at 200-500° C. for 1-10 minutes in a hydrogen gas atmosphere to form the metal particles in said metal film, thereby forming said reaction catalyst on the substrate.

2. The method for producing a carbon nanotube array according to claim 1, wherein the temperature T (° C.) and keeping time t (minute) of said heat treating meet a condition of $t \geq 18{,}000 \times [1/(T+273)] - 17$.

3. The method for producing a carbon nanotube array according to claim 2, wherein the temperature T (° C.) and keeping time t (minute) of said heat treating meet a condition of $t \geq 30{,}000 \times [1/(T+273)] - 28$.

4. The method for producing a carbon nanotube array according to claim 3, wherein the temperature T (° C.) and keeping time t (minute) of said heat treating meet a condition of $t \geq 230{,}000 \times [1/(T+273)] - 210$.

5. The method for producing a carbon nanotube array according to claim 1, wherein said heat treating of said carbon nanotube array is conducted at pressure of 0-1000 Pa.

6. The method for producing a carbon nanotube array according to claim 5, wherein a molar ratio $X_{H2}$ of hydrogen in said mixed gas and the temperature T (° C.) of said heat treating meet a condition of $T \geq -190 \times X_{H2} + 890$.

7. The method for producing a carbon nanotube array according to claim 1, wherein the temperature T (° C.) of said heat treating of said carbon nanotube array is 500-900° C.

8. The method for producing a carbon nanotube array according to claim 1, wherein the time (t) of said heat treating of said carbon nanotube array is 1-100 minutes.

9. The method for producing a carbon nanotube array according to claim 1, wherein said carbon nanotube array is heat-treated at a temperature of 600-900° C. for 3-60 minutes.

10. A method for producing a spun yarn of carbon nanotubes, comprising producing a carbon nanotube array according to the method recited in claim 1 and spinning carbon nanotubes drawn from the carbon nanotube array, wherein the carbon nanotubes have an electric conductivity of $10^3$ S/m or more.

* * * * *